(12) United States Patent
Lee et al.

(10) Patent No.: US 7,707,149 B2
(45) Date of Patent: *Apr. 27, 2010

(54) METHOD, SYSTEM, AND PROGRAM FOR CUSTOMER SERVICE AND SUPPORT MANAGEMENT

(75) Inventors: Andy Ming Lee, West Covina, CA (US); Hsyh-Min Hsu, Diamond Bar, CA (US); Paul Hao, Rowland Heights, CA (US); Shyh-Tyng Edward Sun, Diamond Bar, CA (US); Tracy Tseng, Rancho Cucamonga, CA (US)

(73) Assignee: Alorica, Inc, Chino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/826,121

(22) Filed: Apr. 4, 2001

(65) Prior Publication Data

US 2002/0147732 A1 Oct. 10, 2002

(51) Int. Cl.
*G06F 17/30* (2006.01)
(52) U.S. Cl. .................... 707/10; 707/3; 707/104.1
(58) Field of Classification Search ............... 707/10, 707/102, 9, 100, 200, 3, 104.1; 705/26, 35, 705/4, 15, 105
See application file for complete search history.

(56) References Cited

U.S. PATENT DOCUMENTS

| | | | | |
|---|---|---|---|---|
| 5,724,575 A * | 3/1998 | Hoover et al. | ................. | 707/10 |
| 6,314,089 B1 * | 11/2001 | Szlam et al. | ................. | 370/270 |
| 6,327,363 B1 * | 12/2001 | Henderson et al. | ..... | 379/265.01 |
| 6,542,601 B1 * | 4/2003 | Hernandez et al. | ..... | 379/265.01 |
| 6,606,744 B1 * | 8/2003 | Mikurak | ..................... | 717/174 |
| 6,629,080 B1 * | 9/2003 | Kolls | ........................... | 705/26 |
| 6,654,726 B1 * | 11/2003 | Hanzek | ...................... | 705/26 |
| 6,671,818 B1 * | 12/2003 | Mikurak | ........................ | 714/4 |
| 6,728,685 B1 * | 4/2004 | Ahluwalia | ................... | 705/26 |
| 6,754,641 B2 * | 6/2004 | Kolls | ........................... | 705/44 |
| 6,795,707 B2 * | 9/2004 | Martin et al. | ............... | 455/446 |
| 6,928,412 B2 * | 8/2005 | DeBiasse | ....................... | 705/7 |
| 6,944,645 B2 * | 9/2005 | George et al. | ............... | 709/206 |
| 7,013,290 B2 * | 3/2006 | Ananian | ...................... | 705/27 |
| 2001/0042022 A1 * | 11/2001 | Kirkpatrick et al. | ........... | 705/26 |
| 2001/0051884 A1 * | 12/2001 | Wallis et al. | ................... | 705/4 |
| 2002/0032626 A1 * | 3/2002 | DeWolf et al. | ................ | 705/35 |
| 2002/0040325 A1 * | 4/2002 | Takae et al. | ................... | 705/26 |
| 2002/0077923 A1 * | 6/2002 | Siegel et al. | .................. | 705/26 |
| 2002/0120519 A1 * | 8/2002 | Martin et al. | ................. | 705/21 |
| 2002/0177926 A1 * | 11/2002 | Lockwood et al. | ............. | 701/1 |
| 2002/0194081 A1 * | 12/2002 | Perkowski | .................... | 705/26 |
| 2003/0061104 A1 * | 3/2003 | Thomson et al. | .............. | 705/26 |

* cited by examiner

*Primary Examiner*—Jean M Corrielus
(74) *Attorney, Agent, or Firm*—Law Ofc SC Harris

(57) ABSTRACT

In accordance with the present invention, a method, system, and program for managing the customer and product information of a client by maintaining a common database is disclosed. The present invention connects the client, call center, repair facility and warehouse to efficiently coordinate the customer and product management process. By allowing access to a common database, a user can view and update changes in the customer and product management process in real time increasing the communication and efficiency of delivering service to a customer.

32 Claims, 32 Drawing Sheets

RECORD 62
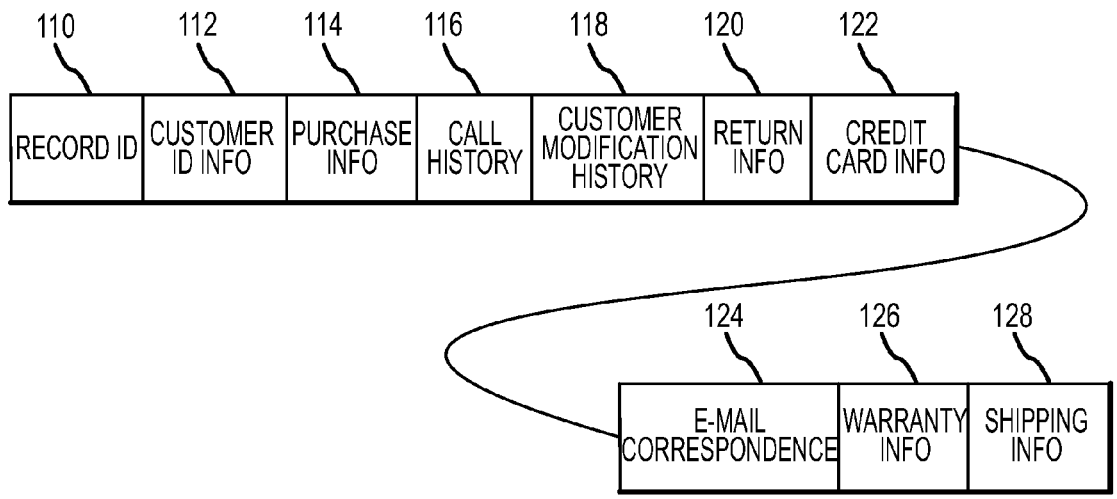
RECORD 64
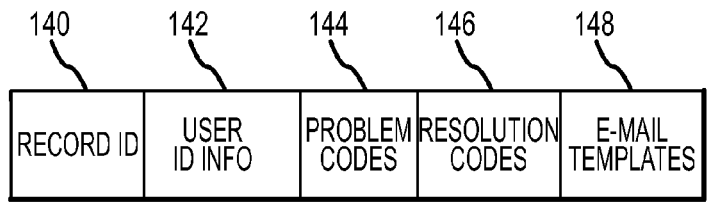
RECORD 66
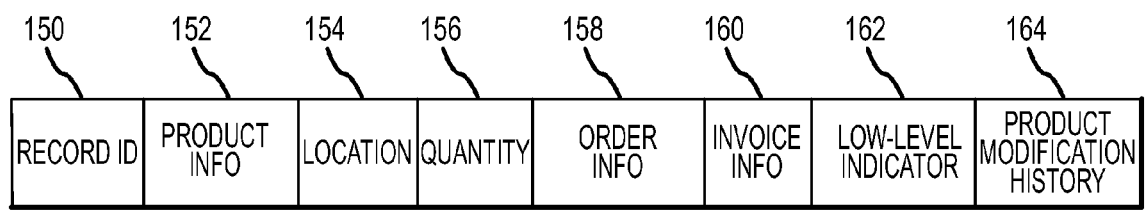
FIG.3

FIG. 10

Customer Information - Microsoft Internet Explorer provided by ALORICA

File  Edit  View  Favorites  Tools  Help

Back  Forward  Stop  Refresh  Home  |  Search  Favorites  History  |  Mail  Print  Edit  Real.com Address: http://crm.alorica.com/enemachines/CustForm.asp?customer_id=166515&Customer_Product_id=175097   Links Agent Name: Paul Hao
Date: 9/13/00

Search  |  Add  |  Sykes RMA  |  Rebate  |  Create Ticket  |  Email  |  New Call  |  Help Files  |  Logout  |
Customer Name: Toni Customer  166515 Product ID:  175097 Part Warranty:  In Call Warranty:  Out Call Num:  10 RMA #:  0  EW: Out Issued Customer Info  |  Product Info  |  ESA Info  |  Escalation Info  |  Call History  |  RMA Info  |  Part Request Info  |  Pay For Support Info  |

Customer ID:            166515
Customer Product ID:    175097
First Name:             [Toni]
Last Name:              [Test]
Address:                [40 Test Drive West]
City:                   [Testville]
State:                  [▼]
Zip:                    [12345]
Day Phone:              [1234567890]
Night Phone(Option):    [9191919191]
Fax(Option):            [8282828282]
Pager(option):          [1818181818]
Email(Option):          [ttttest@testa.com]
Company(option):        [Testa]

[Modify]

Send mail to
Customer Record Modification History

Done                                                                                                          Internet

FIG.11B

Customer Product Detail Information - Microsoft Internet Explorer provided by ALORICA File  Edit  View  Favorites  Tools  Help Back  Forward  Stop  Refresh  Home  |  Search  Favorites  History  |  Mail  Print  Edit  Real.com Address http://crm.alorica.com/emachines/product.asp?customer_id=166515&customer_product_id=175097

Agent Name: Paul Hao       Search  |  Add  |  Sykes RMA  |  Rebate  |  Create Ticket  |  Email  |  New Call  |  Help Files  |  Logout
Date: 9/13/00       Customer Name: Toni Customer   Customer Test ID: 166515   Product ID: 175097   Part Warranty: In Call Warranty: Out Call Num: 10   Issued RMA #: 0   EW: Out   Pay For Support Info Customer Info  |  Product Info  |  ESA Info  |  Escalation Info  |  Customer History  |  RMA Info  |  Part Request Info  |  Pay For Support Info Customer ID:                              166515
Customer Product ID:                      175097
Model Number:                             [400id]
Serial Number:                            [111222333]
Monitor Serial Number:
Purchase Date: (MM/DD/YYYY)               [12]/[10]/[1999]
Part Warranty Expiration Date: (MM/DD/YYYY)  [12]/[10]/[2000]
Purchase Store:
Manufacturer:                             [Emachines]
[Change]
[Modify]

Customer Product Record Modification History:
Agent Name        Date        Comment                    Descript Customer Info  |  Product Info  |  ESA Info  |  Escalation Info  |  Customer History  |  RMA Info  |  Part Request Info  |  Pay For Support Info Internet

```
RMA Detail Information - Microsoft Internet Explorer provided by ALORICA                    _ □ ×
 File  Edit  View  Favorites  Tools  Help                                                       A
 ⇦      ⇨      ⊗    ⟳       ⌂      ☰      ★         ⊕      ⎙     ✉    ✎                     Links »
 Back  Forward  Stop  Refresh  Home  Search  Favorites  History  Mail  Print  Edit
 Address  http://crm.alorica.com/emachines/RMA_Info/ASP?RMANO=EM050022121                        ⇩

Agent Name: Paul Hao                  Search  |  Add  |  Create Ticket  |  Email  |  New Call  |  Help Files  |  Logout  |
Date: 7/11/00                         Customer                                                                    Num
                              Name: Toni Customer  166515  Product  175097  Part        In Call    In Call  10  of  Issue  1  EW: Out
                              Test ID:             ID:              Warranty:  Warranty:  Num:         Num:       Rma:

Customer Info  |  Product Info  |  ESA Info  |  Customer History  |  RMA Info  |  Part Request Info  |  Pay For Support Info  |

RMA Record For Customer ID: 166515 & Customer Product ID: 175097
                                   RMA Status Result RMA Date:                May 22 2000
                        RMA Number:              EM050022121
                        RMA Agent:               Paul Hao
                        First Name:              Toni
                        Last Name:               Test
                        Address1:                40 Test Drive West
                        Address2:
                        Address3:
                        City:                    Testville
                        State:                   Testonia
                        Zip Code:                12345
                        Country:                 US
                        Contact:
                        Phone:                   1234567890
                        Alternate Phone:         9191919191
                        E-mail:                  ttttest@testa.com
                        Alt. E-mail:
                        Model Name:              400id
                        Serial Number:           111222333
                        Warranty (1:In 0:Out):   1
                        Purchase Date:

Done                                                                                          ⊕ Internet
```

Alorica, Inc.: Extended Warranty On-Site Service Support System - Microsoft Internet Explorer provided by ALORICA File  Edit  View  Favorites  Tools  Help Back  Forward  Stop  Refresh  Home  Search  Favorites  History  Mail  Print  Edit Address: http://care.alorica.com/extwarr/frameset.cfm?page_name=customer_info.cfm

| Service Center |
| User Admin |
| Operation Reports |
| Log Out |

Phones:  Day  9096102511
         Evening
         Fax

Email:   paul@alorica.com
Company: Alorica

Product Information

[Edit Customer]

| Model | Serial No | Monitor Serial No | Extended Warranty No | Purchase Date | Purchase From | Status |
|-------|-----------|-------------------|---------------------|---------------|---------------|--------|
| 810001 | test | | | 11/11/1999 | | Approved [Edit] |

Record History

| Agent | Date | Description | Comments |
|-------|------|-------------|----------|
| #dward | 2000-04-12 13:02:57 | Update Customer Record | ttt |
| #dward | 2000-01-31 15:14:47 | Update Customer Record | descr |
| #dward | 2000-01-31 17:08:41 | Update Customer Record | test |
| #dward | 1999-10-27 15:36:24 | Update Customer Record | Update info |
| #dward | 2000-04-28 18:28:17 | Update Customer Record | cc |
| #dward | 2000-04-28 18:28:30 | Update Customer Record | cc |
| #dward | 2000-01-31 10:13:33 | Update Customer Record | dsf |
| sup | 1999-12-07 12:40:17 | Update Customer Record | test |
| sup | 2000-01-24 17:38:14 | test | Modify |

Copyright © 1999 Alorica, Inc.

Receiving Report

| RMA Number | RMA Date | Receive Date | Receive Agent | Receive Shipper | Model No | Part No |
|---|---|---|---|---|---|---|
| Received RMA | | | | | | |
| EM06008135 | 6/8/2000 | 7/7/2000 | | | eMonster 550 | |
| EM06008186 | 6/8/2000 | 7/7/2000 | | | 366i | |
| EM06010123 | 6/10/2000 | 7/7/2000 | | | 366c | |
| EM06010134 | 6/10/2000 | 7/7/2000 | | | 366i2 | |
| EM06011131 | 6/11/2000 | 7/7/2000 | | | 366i2 | |
| EM06012128 | 6/12/2000 | 7/7/2000 | | | 433i | |
| EM06012190 | 6/12/2000 | 7/7/2000 | | | eMonster 500 | |
| EM06013133 | 6/13/2000 | 7/7/2000 | | | 366c | |
| EM06013176 | 6/13/2000 | 7/7/2000 | | | 400i3 | |
| EM06013228 | 6/13/2000 | 7/7/2000 | | | 333cs | |
| EM06013231 | 6/13/2000 | 7/7/2000 | | | 500i | |
| EM06014062 | 6/14/2000 | 7/7/2000 | | | 400i | |
| EM06014087 | 6/14/2000 | 7/7/2000 | | | 366c | |
| EM06014097 | 6/14/2000 | 7/7/2000 | | | 400i3 | |
| EM06015095 | 6/15/2000 | 7/7/2000 | | | 466id | |
| EM06015098 | 6/15/2000 | 7/7/2000 | | | 366i | |
| EM06015122 | 6/15/2000 | 7/7/2000 | | | 366i2 | |
| EM05024097 | 5/24/2000 | 7/7/2000 | | | 400id | |
| EM05024184 | 5/24/2000 | 7/7/2000 | | | 400i | |
| EM05026294 | 5/26/2000 | 7/7/2000 | | | 466is | |

| Product Record Modification History For Product ID: 338 | | | |
|---|---|---|---|
| Agent Name | Date | Note | Action |
| James Chung | 4/11/00 4:01:20 PM | price | Modify |
| James Chung | 4/11/00 4:30:21 PM | price | Modify |
| James Chung | 2/16/00 2:49:34 PM | price | Modify |
| James Chung | 2/4/00 3:01:02 PM | changes | Modify |
| James Chung | 2/4/00 2:00:00 PM | page | Add |

Product Info | Compatible Model | Inventory Records | Inventory P.O. | Add Product | Mail Settings | Agents

FIG. 19A

| Product Main - Microsoft Internet Explorer provided by ALORICA | |
|---|---|
| File Edit View Favorites Tools Help | |
| Back Forward Stop Refresh Home Search Favorites History Mail Print Edit | |
| Address http://www.achjungle.com/bbnac/admin/inventory.asp | |

Paul Hao
7/12/00
Access Level: 1

Inv P.O. | Inventory | Add Product | Settings | Agents | Product Srch | Customer Srch | Report | Logout

| SKU: | Model Type: | Location | Quantity On Hand |
|---|---|---|---|
| 010-00001 | PRINTER HP694C | | 0 |
| 011047-01 | MON 3070A 17 | | 22 |
| 011106 | Newly Manufactured NEC 15 | | 72 |
| 011144 | MON 2160 15 | A3U/A4U/A1 | 81 |
| 011146 | MON 3070A 17 | | 78 |
| 030013 | SC WD1004A-27X | | 0 |
| 030036 | CNTRLR CT1600 SB PRO 11 | | 0 |
| 030037 | SC NX PRO (PCT) 8 BIT | | 0 |
| 030039 | SC BXII AUDIO CONTROLLER | | 0 |
| 030040 | SC SG NX PRO 16BIT | | 0 |
| 030041 | SC SG PRO 16 MOZART | | 1 |
| 030043 | CNTRLR 2nd SERIAL PORT | | 0 |
| 030057 | VB PWB-1841-1 SPECTRIA | | 0 |
| 030059 | VB PWB-1841-3 SPECTRIA | | 0 |
| 030069 | SC SOUND-16ASRS W/O AMP | | 0 |
| 030082 | SC 14.4AMSP. REV.A | D25U/D2U | 992 |
| 030101 | SC 288SP SND2 10K OHM | | 124 |

FIG. 20B eMachines
Agent Name: Paul Hao

Ship to: test test          Mail to: test test                  Date: 12/26/00 12:21:00 PM
         est                          test
         test.CAD1740                 test.CAD1740
         Tel(D): (111) 2223333        Tel(D): (111) 2223333
         Tel(E): (333) 2221111        Tel(E): (333) 2221111
         Email:                       Email: paul@alorica.com Phone: (111) 2223333       Customer ID: 6533       Invoice ID: 1393

| Part No | Location | SKU | Model | City | Ship | Shipped | B/O Available Date | Tracking No. | Method | Unit Price | Sub Total |
|---|---|---|---|---|---|---|---|---|---|---|---|

No Order Items!

| Credit Card Type | Credit Card No | Expiration Date | Pre-Authorization Order No | Pre-Authorization Reference No | Pre-Authorization Return Code | Status |
|---|---|---|---|---|---|---|
| Master Card | 4111111111111111 | 01/00 | | 946405473838106136531 | | SHIPPING_NOTIFIED |

Comment: This is a test

EMachines Support System

RMA Defect Parts Inventory

| SKU | Category | Manufacturer | Description | Price | Quantities | Weight | Location | Edit |
|---|---|---|---|---|---|---|---|---|
| 559 | Floppy Drive | eMachines | eFOD Samsung SFD-321B | | 1 | 1.10 | A12 | Edit |
| 525 | Heat Sinks | eMachines | eFan Orient MMX/AMD-K6 | | 0 | | | Edit |
| 526 | Heat Sinks | eMachines | eFan AAVID MMX/AMD-K6/MII | | 1 | | | Edit |
| 527 | Heat Sinks | eMachines | eFan AAVID MII(w/o PAD) | | 0 | | | Edit |
| 528 | Heat Sinks | eMachines | eFan AAVID Intel PIII SECC2 | | 0 | | | Edit |
| 529 | Heat Sinks | eMachines | eFan Dusung Celeron SEPP (w/o Clip) | | 1 | | | Edit |
| 530 | Heat Sinks | eMachines | eFan Dusung Celeron SEPP Clip | | 1 | | | Edit |
| 531 | Heat Sinks | eMachines | eFan AAVID Celelron FCPGA | | 0 | | | Edit |
| 532 | Heat Sinks | eMachines | eFan Foxoconn Intel FCPGA | | 1 | | | Edit |
| AL002 | KDS Products | KDS | eOne mouse | | 0 | | | Edit |
| AL003 | KDS Products | KDS | eOne Keyboard | | 2 | | | Edit |
| AL004 | KDS Products | KDS | eOne power cord | | 7 | | | Edit |
| 566 | Keyboards | eMachines | eKB Chicony 2971-Standard | | 3 | | | Edit |
| 567 | Keyboards | eMachines | eKB Chicony 5001-Standard | | 74 | | | Edit |
| 568 | Keyboards | eMachines | eKB BTC 5000A(5-Key/Internet) | | 159 | | | Edit |
| 569 | Keyboards | eMachines | eKB BTC 5190(19-Key/ekeys) | | 6 | | | Edit |
| 232 | Modems | eMachines | eModem Rockwell MW560C1 | | 0 | | | Edit |
| 414 | Modems | eMachines | eModem Lucent MM9250 | | | | | Edit |
| 571 | Mouse | eMachines | eMouse Logitech M-SA551 | | | | | Edit |
| AL001 | Power Cord | eMachines | eTower / eView card | | | | | Edit |

| | | Alorica Clients - Microsoft Internet Explorer provided by ALORICA | | _ 🗗 × |
|---|---|---|---|---|
| File Edit View Favorites Tools Help | | | | A |
| ⇦ Back | ▶ Forward | ⊗ Stop | 🔄 Refresh | 🏠 Home | 🔍 Search | ★ Favorites | 🕒 History | ✉ Mail | 🖨 Print | ✏ Edit | ○ Real.com | | Links » |
| Address: http://clients.alorica.com/frameset.cfm | | | | ▼ |

Alorica Client

Client: emachines

Group: [▼]

Date: 9/12/2000 ☐

○ Log Out
○ Add ACD
○ Get Group
○ Add Group
○ Clients/Users
○ Reports
○ Admin.

eMachines Parts Request Detail Report

Request Date: 09/09/2000 - 09/09/2000
Status: OPEN

| Request Date | Request ID | Name | Ship Date | Ship Method |
|---|---|---|---|---|
| 09/09/00 | EPR090009023 | Leblanc, Stewart | | ups ground |
| 09/09/00 | EPR090009049 | OLIVER, KIM | | ups ground |
| 09/09/00 | EPR090009075 | Dudley, Margaret | | ups ground |
| 09/09/00 | EPR090009101 | LEWRY, MARK | | ups ground |
| 09/09/00 | EPR090009127 | ARRICK, KAROLYN | | ups ground |
| 09/09/00 | EPR090009153 | ZULSTRE, BRIAN | | ups ground |
| 09/09/00 | EPR090009179 | Poing, Jamie | | ups ground |
| 09/09/00 | EPR090009180 | Ddamron, scotty | | ups ground |
| 09/09/00 | EPR090009181 | Brust, Kimberly | | ups ground |
| 09/09/00 | EPR090009182 | Potins, James | | ups ground |
| 09/09/00 | EPR090009183 | salcedo, carlos | | ups ground |
| 09/09/00 | EPR090009184 | Glaser, Gary | | ups ground |
| 09/09/00 | EPR090009185 | Roca, Carlos | | ups ground |
| 09/09/00 | EPR090009186 | Sher, Greg | | ups ground |
| 09/09/00 | EPR090009187 | Flegel, Randy | | ups ground |
| 09/09/00 | EPR090009188 | Cracken, Todd | | ups ground |
| 09/09/00 | EPR090009189 | DANNO, RICHARD | | ups ground |
| 09/09/00 | EPR090009190 | CHATFIELD, MICHELE | | ups ground |
| 09/09/00 | EPR090009001 | DUPOUX, ERROL | | ups ground |
| 09/09/00 | EPR090009002 | MICHEL, JANET | | ups ground |
| 09/09/00 | EPR090009003 | Baxter, Charlese | | ups ground |
| 09/09/00 | EPR090009004 | Learn, Deanne | | ups ground |
| 09/09/00 | EPR090009005 | Berkovitz, Paul | | ups ground |
| 09/09/00 | EPR090009006 | ISRAEL, SHAUN | | ups ground |
| 09/09/00 | EPR090009007 | brodigan, edward | | ups ground |
| 09/09/00 | EPR090009008 | ISRAEL, SHAUN | | ups ground |
| 09/09/00 | EPR090009009 | MCDEVITT, ROBERT | | ups ground |

Done | 🌐 Internet

METHOD, SYSTEM, AND PROGRAM FOR CUSTOMER SERVICE AND SUPPORT MANAGEMENT

BACKGROUND OF THE INVENTION

1. Field of the Invention

The present invention relates in general to business management software, and more particularly to a web-based, integrated service and support software suite.

2. Description of the Related Art

Managing product logistics and customer care is often the most difficult aspect of business. Companies have invested huge amounts of money and resources to make sure their products are readily available and that their customers receive the best service. However, customer relations do not end with the sale of the product. Servicing a customer after the purchase of a good is also a major challenge to the manufacturer of that product. Responding to e-mail inquiries and warranty service requests is a labor intensive exercise often requiring huge labor support. The problem is compounded because a customer will often contact the manufacturer after the purchase only if something has gone wrong. Either the product is not performing properly or the customer has problems operating the device. Usually, such situations create a difficult atmosphere where the customer will often be in an impatient mood. Therefore, the type of experience a customer may have in contacting the manufacturer or manufacturer's representative may directly affect the manufacturer's reputation, the loyalty of the customer for future purchases of the manufacturer's product, and/or the future retail value of the product itself.

Furthermore, managing customer service has been a difficult task because multiple parties are involved throughout the customer service process. The manufacturer, supplier, retailer, and back-end (i.e. after purchase) service provider are often completely separate and independent organizations. For example, manufacturers will often outsource the call handling process to a third party call center, independent from the manufacturer. If the customer service center needs to order a replacement product or order warranty/repair work, the customer service center would have to go outside its organization to perform the work. Therefore, the managing of the process has been a difficult task for the manufacturer and its third party vendors.

Systems in the prior art have attempted to create business solutions by computerizing parts of the process. Complex and expensive Enterprise Resource Planning ("ERP") software has been used by large scale manufacturers to control the inventory and supply chain. In addition, various call tracking software have been created to assist operators in correctly taking down information from the customer. In addition, client/customer management software have been created to keep track of contact information and customer purchases. Moreover, a existing warehouse or repair facility software would track the product through the repair process, to identify the location and estimated dates relevant to the product. However, the existing business tools are often not compatible with each other, causing redundancy and implementation problems. Moreover, because each business tool requires a separate software license, for a small or medium size business, the existing tools are often cost prohibitive.

Accordingly, there is a need in the art for an improved business management system that addresses the concerns of the providing back-end services for manufacturers and retailers, their customers, and their third party vendors.

SUMMARY OF THE PREFERRED EMBODIMENTS

The preferred embodiments provide a computerized system, method, and program for providing a multi-functional customer and product management tool over a common network, such as the Internet, available to various parties such as the client/manufacturer, repair facility, call center, and the warehouse. To this end, a common customer record for each customer is generated in a database which can be updated to include information such as customer contact and purchase history information. In addition, a common product record for each product is generated in a database which can be updated to include information such as general product and warehouse inventory information. Both the customer and product records are then made available to a user depending on the functionality of the management tool chosen by the user. In addition, the management tool allows the user depending on the chosen functionality of the management tool to update customer and product information. Moreover, the management tool keeps track of all additions and modifications to customer and product information to provide better customer support and error detection. In addition, the preferred embodiments of the management tool provide a back-end e-commerce solution to process and control all aspects of the purchase and shipping process. Lastly, the preferred embodiments of the management tool is able to act as a decision support system by providing reports to assist managers in making executive decisions.

BRIEF DESCRIPTION OF THE DRAWINGS

Referring now to the drawings in which like reference numbers represent corresponding parts throughout:

FIG. 3 illustrates files in records in accordance with preferred embodiments of the present invention;

FIGS. 10-22 illustrate examples of HTML pages that are implemented as part of the graphical user interface.

DETAILED DESCRIPTION OF THE PREFERRED EMBODIMENTS

In the following description, reference is made to the accompanying drawings which form a part hereof and which illustrate the preferred embodiment of the present invention. It is understood that other embodiments may be utilized and structural and operational changes may be made without departing from the scope of the present invention.

Figure 1:
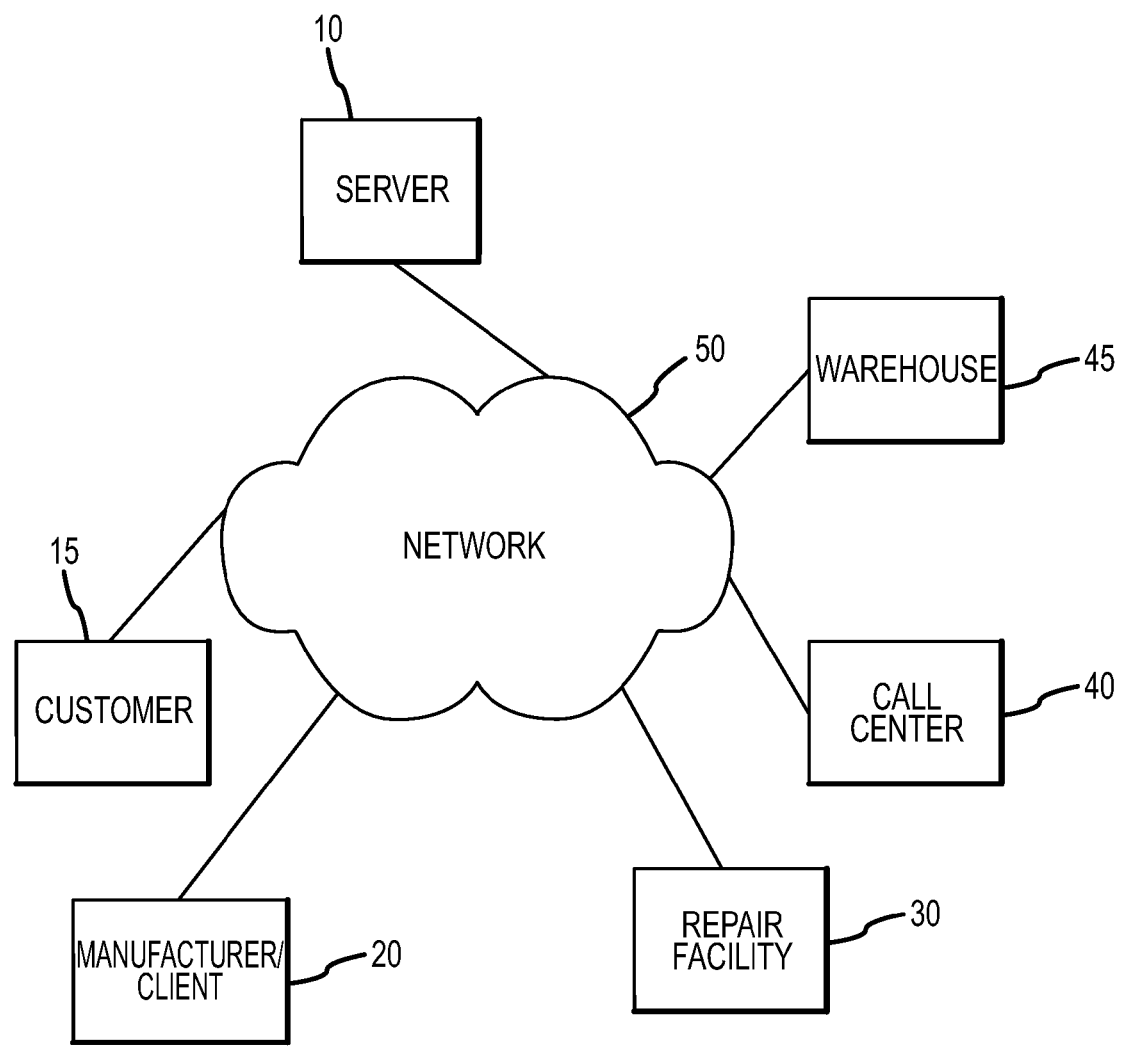
FIG. 1 illustrates a network computing environment in which preferred embodiments are implemented.

FIG. 1 is a schematic overview diagram of the network computing environment in which the preferred embodiments are implemented. In preferred embodiments, a server 10 is linked to a customer computer 15, a manufacturer/client computer 20, repair facility computer 30, call center computer 40, and a warehouse computer 45 (collectively "user computers") using a network 50, such as the Internet. The network 50 may be comprised of any network system known in the art including TCP/IP based networks (e.g., an Intranet, the Internet), LAN, Ethernet, WAN, Token Ring, etc. Alternatively, there may be separate and different networks between the components. Further, there can be numerous customer, manufacturer/client, repair facilities, call center, and warehouse computers, however a single computer 15, 20, 30, 40, and 45 for each category of user is used for illustration purposes.

Figure 2:
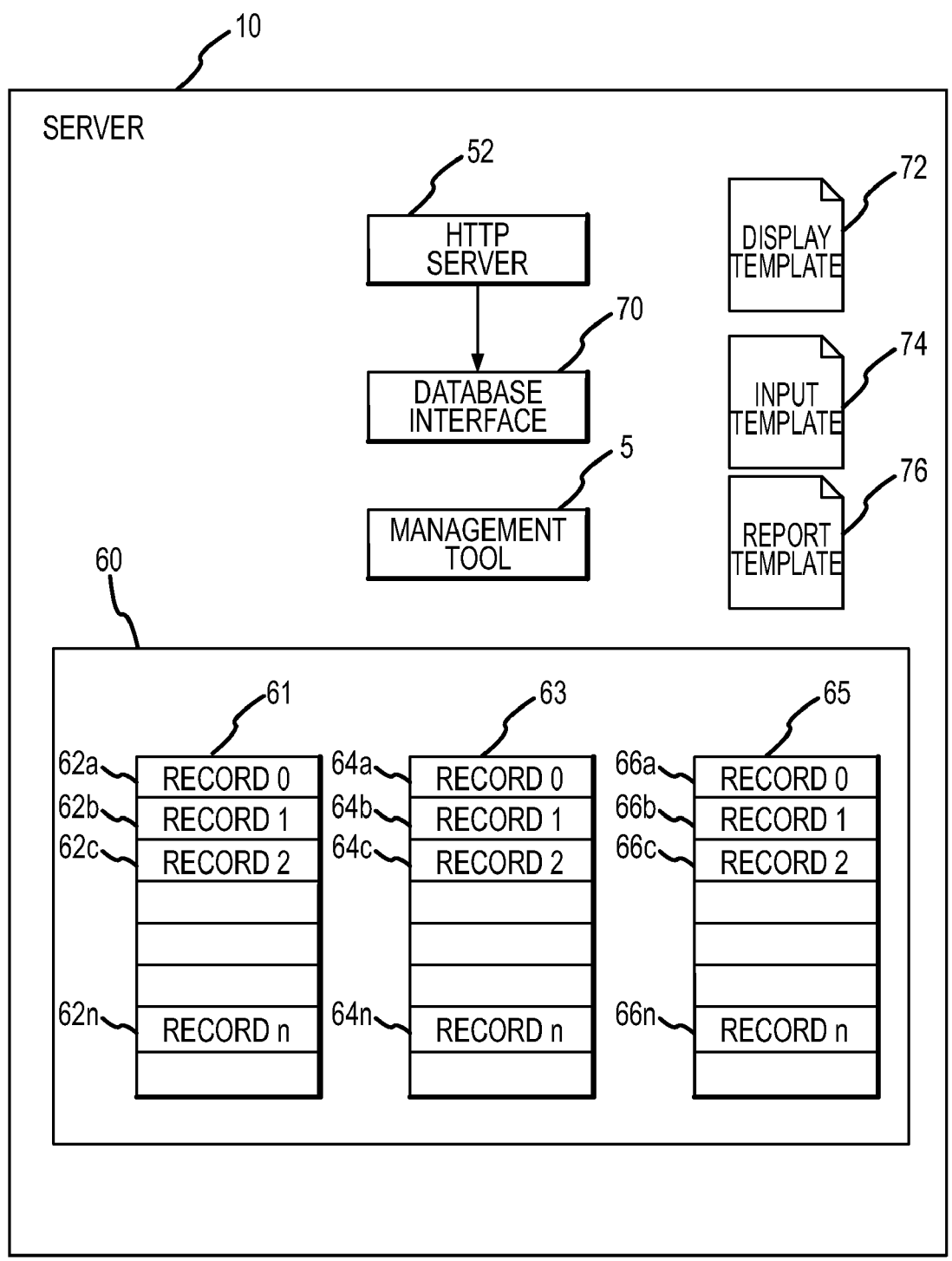
FIG. 2 illustrates a computing environment of a server in accordance with preferred embodiments of the present invention.

FIG. 2 illustrates software components in the server 10 in which preferred embodiments are implemented, including a Customer and Product Management Tool 5, a Hypertext Transfer Protocol (HTTP) server 52, database 60, database interface 70 and templates 72, 74, and 76. The HTTP server 52 responds to requests from the user computers 15, 20, 30, 40, and 45 using HTTP client programs, such as web browser programs known in the art. Upon accessing the server 52 through the network 50 using a unique network address, such as an IP address, the management tool 5 will give specific access to the various modules in the management tool 5, depending on the secured identification provided by the user computers 15, 20, 30, 40, and 45. The management tool 5 works in conjunction with the database interface 70 to retrieve and store data in database 60 to coordinate the various customer and product management processes. The management tool 5 and its specific modules will be discussed in more detail below with respect to FIG. 4.

The database 60 provides the customer, manufacturer/client, repair facility, call center and the warehouse with a central location to store and retrieve current, accurate information for varying parts of the client/product management process. The database 60 comprises a database program known in the art, such as a relational database program. In the preferred embodiments, the database 60 includes three database tables 61, 63, and 65. Database table 61 includes records 62a, b, . . . n, which are used in the preferred embodiment as customer records 62a, b, . . . n to store information about the customer. Similarly, database table 63 includes records 64a, b, . . . n, which are used in the preferred embodiment as user records 64a, b, . . . n to store information about the various users of the client/product management software, and finally, database table 65 includes records 66a, b, . . . n, which are used in the preferred embodiment as product records 66a, b, . . . n to store information about the various products.

The database interface 70 may comprise a Common Gateway Interface (CGI) program, a Java servlet, or other web page implementation known in the art to present the information in database 60 in a presentable format (e.g. HTML page, etc.). In preferred embodiments, the database interface 70 uses a secured login/password verification for identifying the individual customer 15, manufacturer/client 20, repair facility 30, call center 40, and warehouse 45 computers contacting the HTTP server 52. The individual users login/password are compared with the login/password stored in the user record table 63 to verify the identity of the user. The unique identification will allow the database interface 70 to identify which parts of the customer or product records 62a, b, . . . n or 66a, b, . . . n are accessible by the requesting party and will appropriately give read/write capabilities to the customer or product records 62a, b, . . . n or 66a, b, . . . n. For example, the secured login id for a call support representative ("CSR") will give the access to the customer information records, warranty administration records, etc., but not to the inventory management records. In addition, the accessed user records 64a, b, . . . n will have associated information pertinent to the user. Additional details of the particular records available to each party will be discussed below in conjunction with the specific modules that are part of the preferred embodiment.

The server 10 further stores a display template 72, an input template 74, and a report template 76 which are preferably implemented in a document in which dynamic content may be generated (i.e. HTML, Extended Markup Language (XML) Document, etc.). Differing variations of the display template 72, input template 74 and report template 76 exist for the users, depending on the information to be displayed or inputted, but a single display template 72, input template 74, and report template 76 are used for illustration purposes in FIG. 2. The display template 72 is used to provide the user computers 15, 20, 30, 40, 45 with customer and/or product information from the database tables 61 and 63. The database interface 70 generates data into the display template 72 from one or more of the records 62a, b, . . . n and/or 66a, b, . . . n in the database 60. The input template 74 includes fields in which the user computers 15, 20, 30, 40, 45 may enter information on the customer/management process and used to update one or more records 62a, b, . . . n and/or 66a, b, . . . n in the database 60. Lastly, the report template 76 is used to generate various reports based on the information stored in one or more of the records 62a, b, . . . n and/or 66a, b, . . . n.

The database 60, display template 72, input template 74, and report template 76 are preferably stored in a non-volatile storage system, such as one or more hard disk drives, used by the server 10 for storage. The server 10 may load data from the storage system into volatile memory (not shown) when processing.

The server 10 or the user computers 15, 20, 30, 40, 45 may comprise any type of computer device known in the art, including server, personal computer, mainframe, workstation, hand held device, etc. Moreover, the server 10 may comprise one or more separate computer systems to run the different program components 52, 60, and 70.

FIG. 3 provides an implementation of the fields in the customer records 62a, b, . . . n, which include:

Record ID 110: Provides a unique identifier generated by the database interface 70 for each customer.

Customer ID Information 112: Comprises one or more sub-fields indicating the name, customer id #, address, telephone, and other contact information of the user.

Purchase Info 114: Comprises one or more sub-fields providing purchasing history about the customer including the serial #s, model names, parts requests, and dates of all products purchased by the customer.

Call History 116: Comprises one or more sub-fields providing contact history of customer contact including all calls, e-mails or letters from the customer.

Customer Modification History 118: Comprises one or more sub-fields indicating any change to the customer record including modifier's name, date, etc.

Return Information 120: Comprises one or more sub-fields indicating any products being returned, return merchandise account #s ("RMA")(the number assigned to track the returned merchandise), problem codes, and various dates (e.g. RMA issue date, shipped date, received date, etc.).

Credit Card Information 122: Comprises one or more subfields indicating the customer's card name, card number, expiration date, billing address, etc.

E-mail correspondance 124: Provides a log of all e-mail received and sent to the customer.

Warranty Information 126: Comprises one or more subfields recording warranty information including any extended warranty purchased, warranty expiration dates, etc.

Shipping Information 128: Comprises one or more subfields recording the shipping information selected by the customer after the purchase of a product including the tracking information on the delivery of the product to the customer including method of shipment, carrier, date of shipment and estimated time of arrival ("ETA").

FIG. 3 also provides an implementation of the fields in the user records 64a, b, . . . n of the preferred embodiments, which include:

Record ID 140: Provides a unique identifier generated by the database interface 70 for each user.

User ID Information 142: Stores a unique username and password that identifies the user, and allows the user to login and access specific customer and/or product information.

Problem Codes 144: Provides codes specific to the user to identify problems/issues expected to be encountered by the user.

Resolution Codes 146: Provides codes specific to the user to identify solutions/conclusions expected to be derived by the user.

E-mail Templates 148: Provides basic templates to respond to e-mail based on problem codes.

FIG. 3 also provides an implementation of the fields in the product records 66a, b, . . . n of the preferred embodiments, which include:

Record ID 150: Provides a unique identifier generated by the database interface 70 for each product.

Product Information 152: Comprises one or more subfields indicating the product name, product id #, description, etc.

Location 154: Indicates the location of products currently available at the warehouse, supplier, and/or the store.

Quantity 156: Indicates the number of products currently available at the warehouse, supplier, and/or the store.

Order Information 158: One or more sub-fields set by the database interface 70 indicating the pull status (i.e. status of the products being pulled from the warehouse to the store or to be sent to the customer) and order status (i.e. status of the products being ordered from supplier).

Invoice Information 160: Comprises one or more subfields indicating the price, shipping fee, coupon information, etc. associated with the products.

Low-Level Indicator 162: Provides the preset number of products left in inventory before the notice of low-level is sent.

Product Modification History 164: Comprises one or more sub-fields indicating any change to the product record including modifier's name, date, etc.

Those skilled in the art will appreciate that FIG. 3 is a preferred embodiment of the record 62a, b, . . . n, 64a, b, . . . n, and 66a, b, . . . n, but not as the only implementation. The records 62, 64, and 66 can be structured in many alternative formats to accomplish the present invention. For example, the separate Location 154 and Quantity 156 fields may not be needed and instead a single field may be used to indicate both the location and quantity. Another example is the problem codes 144 resolution codes 146, and e-mail templates 148 in the user record 64 do not need to be associated with directly with the user record 64, but instead stored on the server 10 apart from the database 60. Thus, the database tables 61, 63, and 65 can be structured in many alternative formats to accomplish the present invention.

Figure 4:
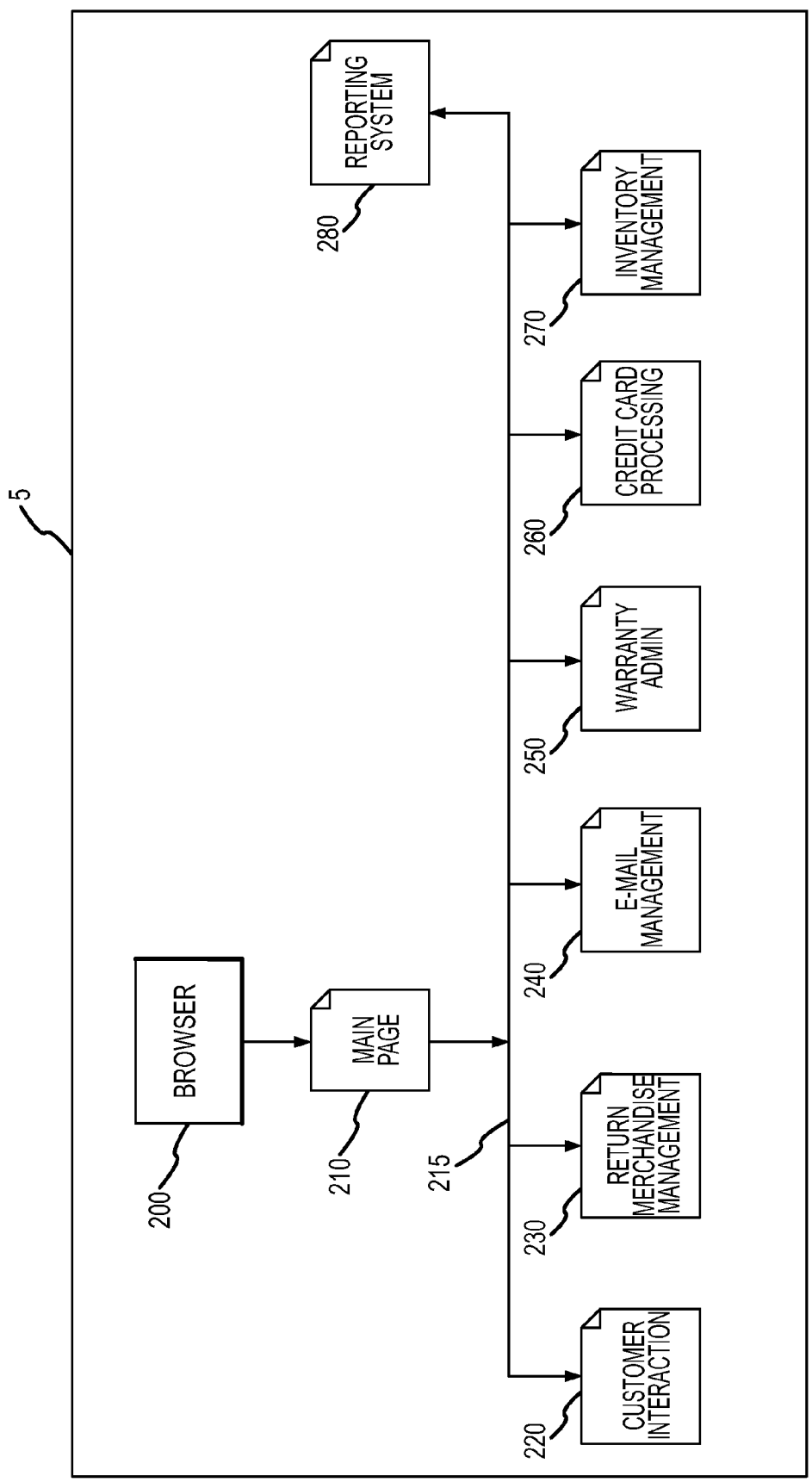
FIG. 4 illustrates the components of the management tool implemented to perform the present invention.

The management tool 5 of the present invention is an integrated customer and product management solution performing various tasks through different modules in the management tool 5. FIG. 4 gives an overview of the management tool 5 as it integrates the various modules 220, 230, 240, 250, 260, 270, and 280 through linked directories of pages that may be navigated using an Internet browser, e.g., Microsoft Internet Explorer, Netscape Communicator, etc. The FIG. 4 illustrates the components of the management tool 5, including a browser program 200, such as a web based browser or other viewing program known in the art, a main page 210 that provides an index to the other modules, including hyperlinks 215 to the actual modules 220, 230, 240, 250, 260, 270, and 280. The terms hypertext link and hyperlinks are used interchangeably herein to refer to an element in an electronic document that links to another place in the same document or to an entirely different document. Typically, a user clicks on the hyperlink to follow the link. Modules included in the management tool 5 are a Customer Interaction Module 220, a Return Merchandise Management module 230, an E-mail Management module 240, a Warranty Administration Module 250, a Credit Card Processing Module 260, an Inventory Management Module 270, and a Reporting System module 280. In the described implementations, the main page 210 provides hyperlinks 215 to one or more of the modules 220, 230, 240, 250, 260, 270, and 280, each comprised of multiple linked text plan pages which provide pertinent features and information relevant to the module using the common data stored in database 60. Each module will be discussed in greater detail with respect to FIGS. 5-9.

FIGS. 5, 6, 7, 8, and 9 illustrate the program logic embedded in the management tool 5, HTTP server 52, and database interface 70 to implement the customer and product management processes of the preferred embodiments. In addition, FIGS. 10-20 will be discussed alongside the program logic to illustrate examples of HTML page implementations of various pages within the modules 220, 230, 240, 250, 260, 270, and 280 accessible through browser 200.

Figure 5:
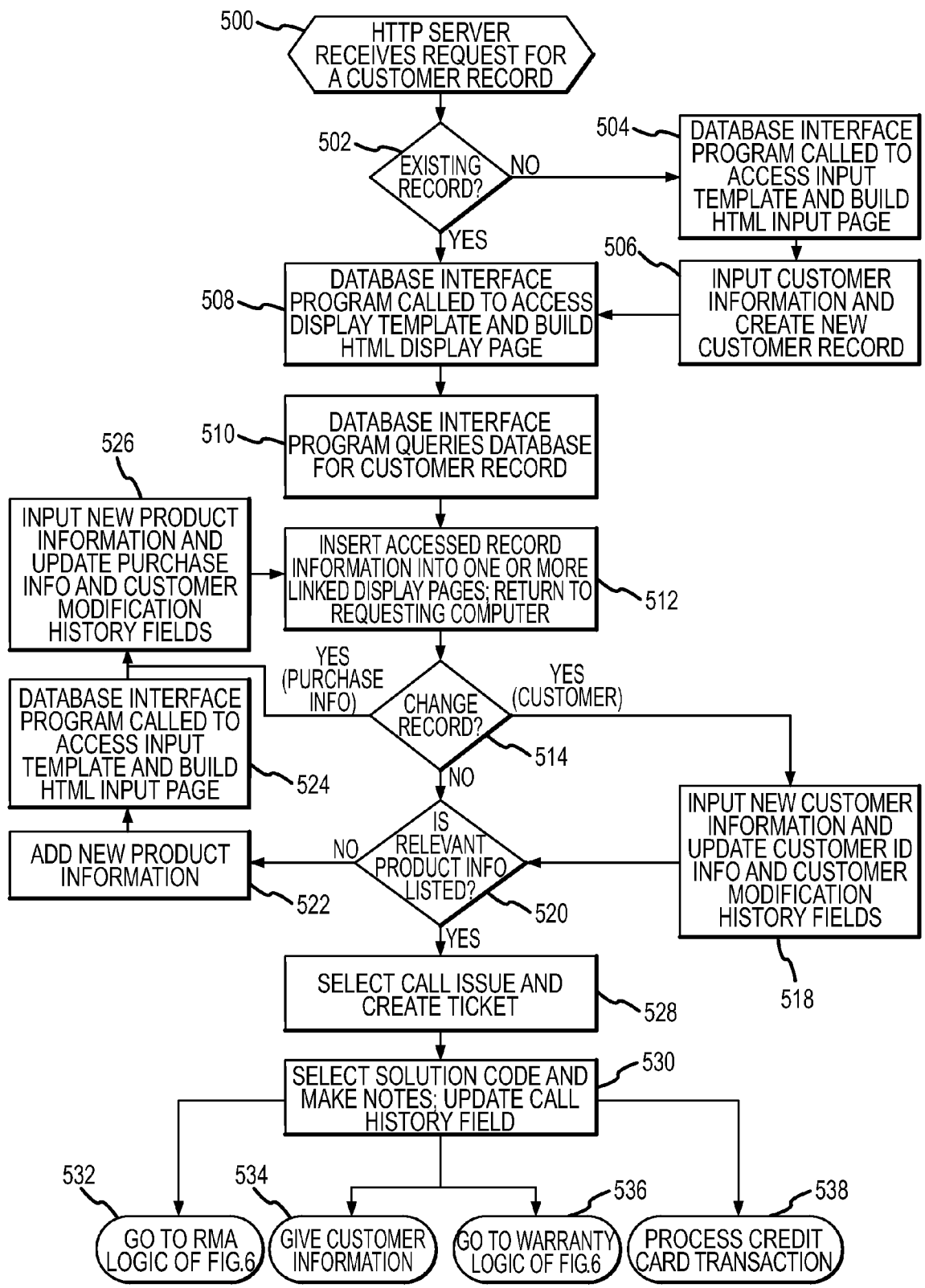
FIG. 5 illustrates a program flow implemented in the server to provide customer and product information for the Customer Interaction Module.

FIG. 5 illustrates the program logic to provide customer record 62a, b, . . . n and product record 66a, b, . . . n information for the customer interaction module 220. Typically, the customer interaction module 220 begins with a phone call from the customer to the call center. The customer interaction module 220 allows the customer service representative (CSR) to maintain and log customer records for customers that call in for technical support, or customer service, such as purchase or information requests, e.g. status on a particular order. A CSR, who has already logged into the customer interaction module 220 via a secured identification and password, will handle the call and attempt to access the customer's information via the secured network 50. At block 500, the HTTP server 52 receives a request from the call center computer 40 for information on a customer record 62a, b, . . . or n. At block 502, a determination is made by the database interface 70 on whether the customer record exists. The database interface 70 can search for the customer record 62a, b, . . . or n using the customer name, phone number, serial number, RMA number, or part request number looking at Customer ID Information 112, Purchase Info 114, and Return Info 120 Fields of the customer records 62a, b . . . n. If no existing customer record is found, the customer interaction module 220 will give the option to add a new customer record. To create a new customer record 62a, b, . . . or n, the database interface 70 (at block 504) accesses the input template 74 and builds an HTML web page. At block 506, the built HTML input page is then sent to the call center computer 40, where the CSR can enter customer information such as name, address, phone number, e-mail, etc. The HTTP server 52 then receives the HTML input page with the customer information entered by the CSR. In response, the HTTP server 52 requests the database interface 70 to create a new customer record 62a, b, . . . or n, and fill in the customer id info field 112 of the new record with the information inputted by the CSR, as well as keep track of the creation of the record 62a, b, . . . or n in the customer modification history field 118. The customer modification history field 118 will keep track of user name, date, description of changes, and any additional comments related to any modification in the customer record 62a, b, . . . or n.

Whether a new record 62a, b, . . . or n is created or an existing customer record 62a, b, . . . or n is found, the database interface 70 (at block 508) accesses the display template 72 and builds an HTML web page. The database interface program 70 queries (at block 510) the database table 61 for the requested or newly created record 62a, b, . . . or n and then inserts (at block 512) the returned information into the display template. The database interface 70 will then build one or more linked HTML web pages based on a display template 72 which will list a menu of information available to the CSR such as customer info, purchase history, customer service history, warranty and extended service agreement information, return information, part request information, credit card information, etc. Thus, the generated display pages can include information from such fields as Customer ID Info 112, Purchase Info 114, Call History 116, Customer Modification History 118, Return Info 120, Credit Card Info 122, E-mail Correspondence 124, Warranty Info 126, and Shipping Info 128.

Figure 11A:
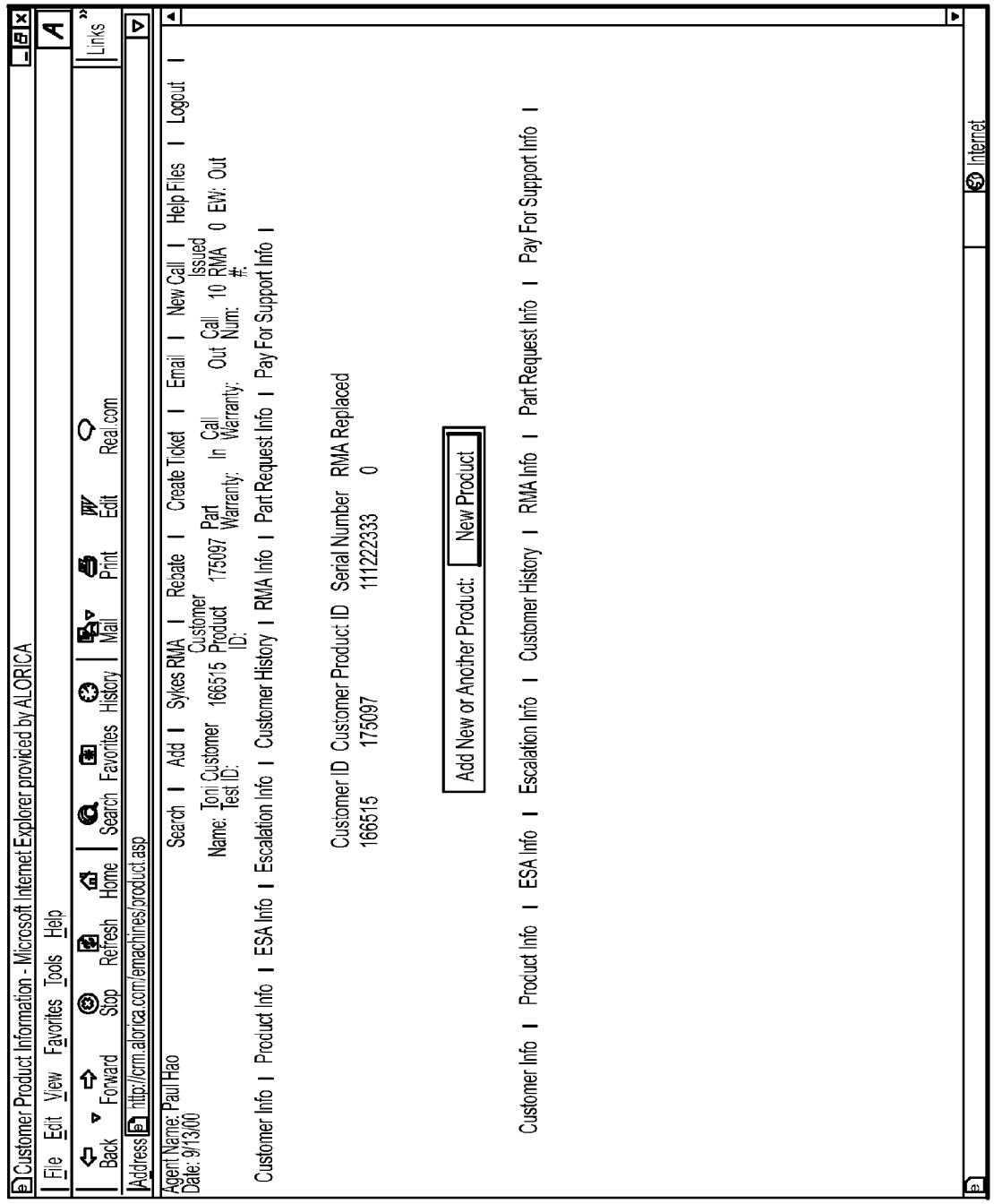

Once the relevant customer record 62a, b, . . . or n is displayed, where an example of the customer record is shown in FIG. 10, the CSR at block 514 can make modifications to the customer information if the contact information needs to be changed. To update a customer record 62a, b, . . . or n, at block 518, the CSR can just change and enter the new customer information such as name, address, phone number, e-mail, etc. In response, the HTTP server 52 requests the database interface 70 to update the customer id info field 112 with the new information and record the change in the customer modification history field 118 of the specific customer record 62a, b, . . . or n. Similarly, at block 514, the CSR can also change the product information, where the purchase info 114 and the customer modification history 118 fields will be updated at block 526. At block 520, if the relevant product which the customer is calling about is not listed, the CSR can add a new product under the customer's record, as illustrated in FIG. 11A. To add new product information, the database interface 70 (at block 524) accesses the input template 74 and builds an HTML web page. At block 526, the built HTML input page is then sent to the call center computer 40, where the CSR can enter the product information such as product name, model number, serial number, purchase date, etc. as seen in FIG. 11B. The HTTP server 52 then receives the HTML input page with the purchase information entered by the CSR. In response, the HTTP server 52 requests the database interface 70 to update the purchase info 114 and the customer modification history 118 fields, and the updated customer record 62a, b, n will be redisplayed in one or more linked display pages at block 512.

Figure 12:
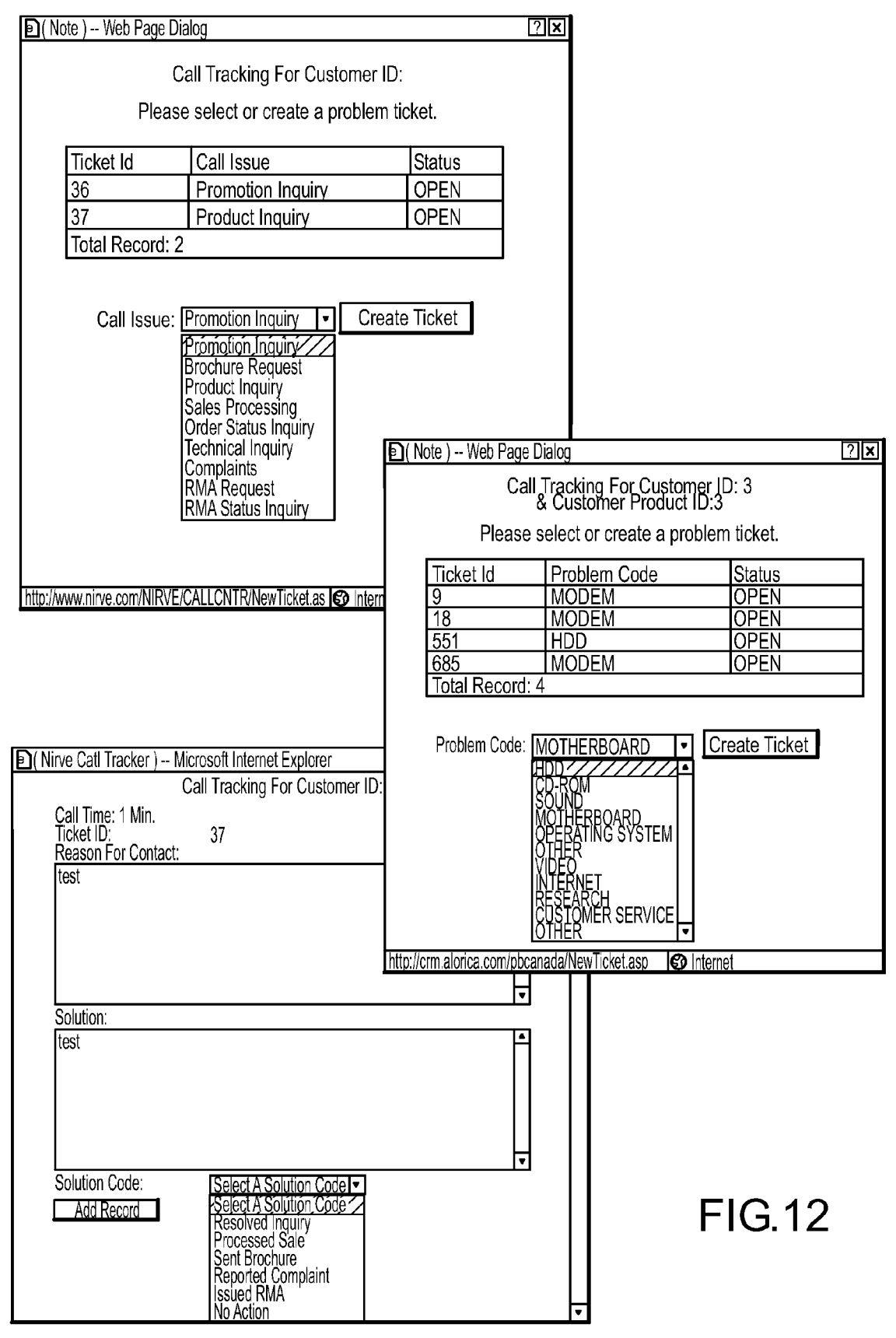

If the relevant product information is listed as seen in FIG. 11, the CSR can then select the create ticket page since each customer interaction has to be tracked before it is terminated. An example of the Create Ticket Page is seen in FIG. 12. At block 528, the CSR can select a call issue or problem code from the list of problem codes likely to be encountered by the CSR from the list stored in Problem Codes 144 field associated with the user, and create a ticket. In the preferred embodiments, the CSR, at block 530, then fills out a note field explaining the reason for the call and the resolution for the call, as well as selecting a resolution code from the list stored in the Resolution Codes 146 field associated with the user. The codes are completely customizable and can include "Resolved Inquiry," "Processed Sale," "Issued RMA," "No Action," "Reported Complaint," for customer service/returns issues or product/part codes directly such as "Modem," "HDD," "Motherboard", etc. Depending on the solution, the CSR can then enter the Return Merchandise Management 230 (at block 532), the Warranty Administration 250 (at block 536), Credit Card Processing (at block 538) modules, or simply give the customer information (at block 534).

Figure 6:
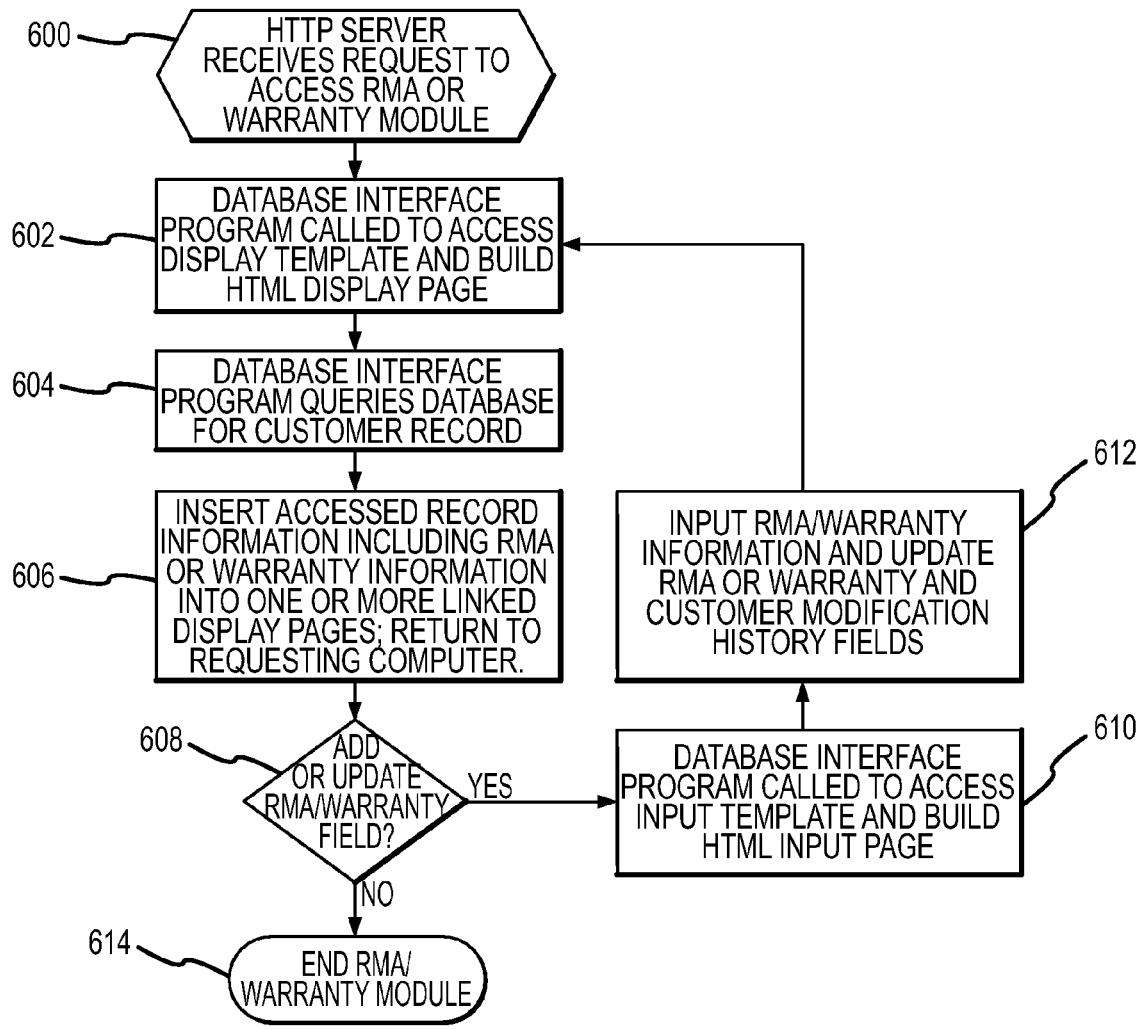
FIG. 6 illustrates the program flow implemented in the server to administer the Return Merchandise Management and the Warranty Administration modules in accordance with preferred embodiments of the present invention.
Figure 15A:
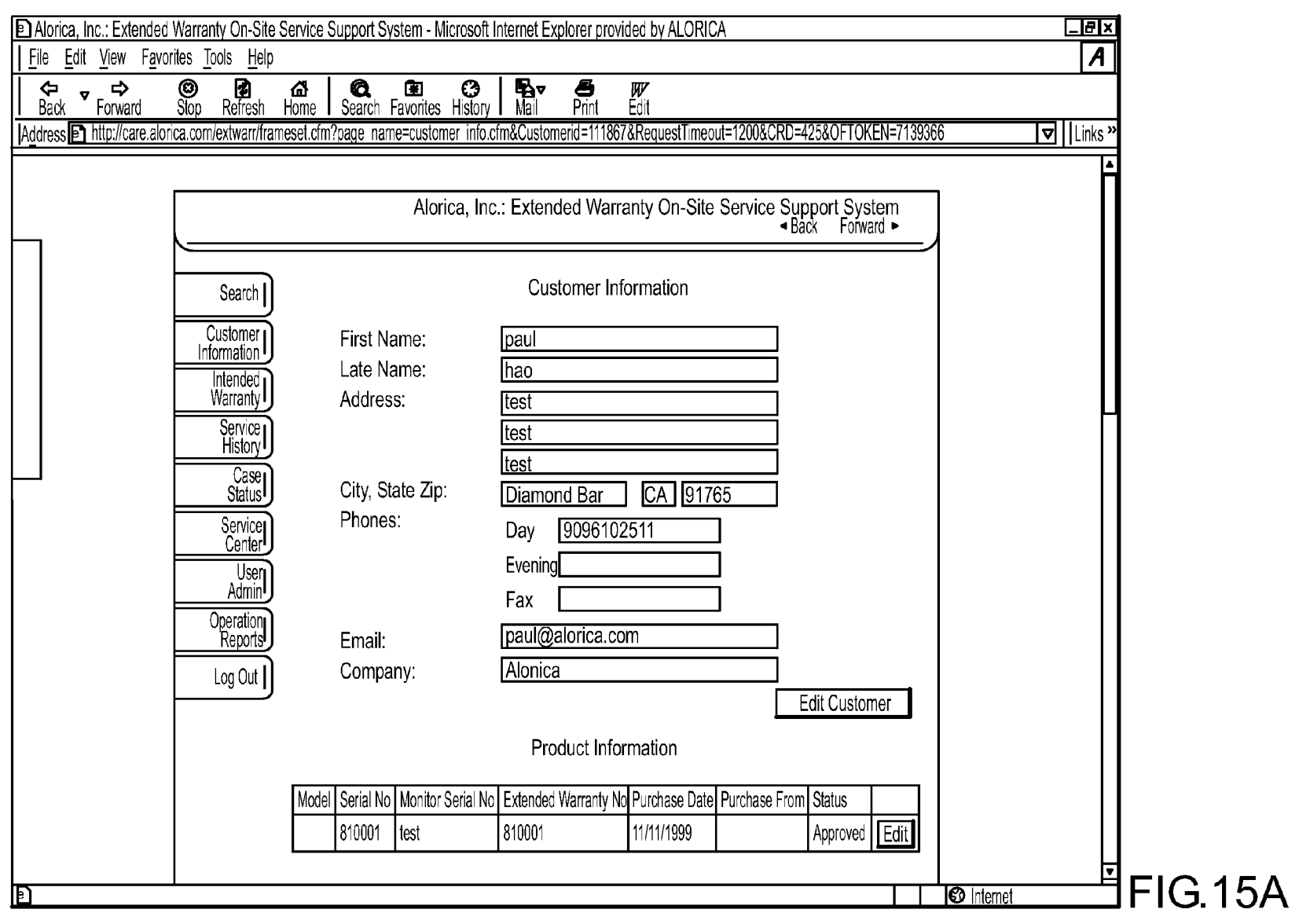

FIG. 6 illustrates the program logic implemented in the HTTP server 52 and database interface 70 to administer the Return Merchandise Management 230 and the Warranty Administration 250 modules. The modules 230 and 250 can be accessed by the CSR from the customer interaction module 220 for informational purposes or to issue an RMA by selecting the RMA information page. In addition, the repair facility 30 can access the modules 230 or 250 to update the repair process and/or check on the warranty status. As in the logic of FIG. 5, the repair facility 30 can search for the specific product or customer information by searching the database for the customer record 62a, b, . . . or n as illustrated in FIG. 13A and FIG. 15A. At block 600, the HTTP server 52 receives a request from the call center 20 or repair facility 30 computers to access the Return Merchandise Management 230 or Warranty Administration 250 modules. In response, the HTTP server 52 requests (at block 602) the database interface 70 to access the display template 72 and build (at block 604) one or more HTML display pages by querying the return info 120 or warranty info 126 fields for the specified customer record 62a, b, . . . n. At block 606, the built HTML display pages are then sent to the call center 20 or repair facility 30 computers, where the user can view and edit the RMA and/or warranty information associated with the customer record 62a, b, . . . or n.

Figure 14A:
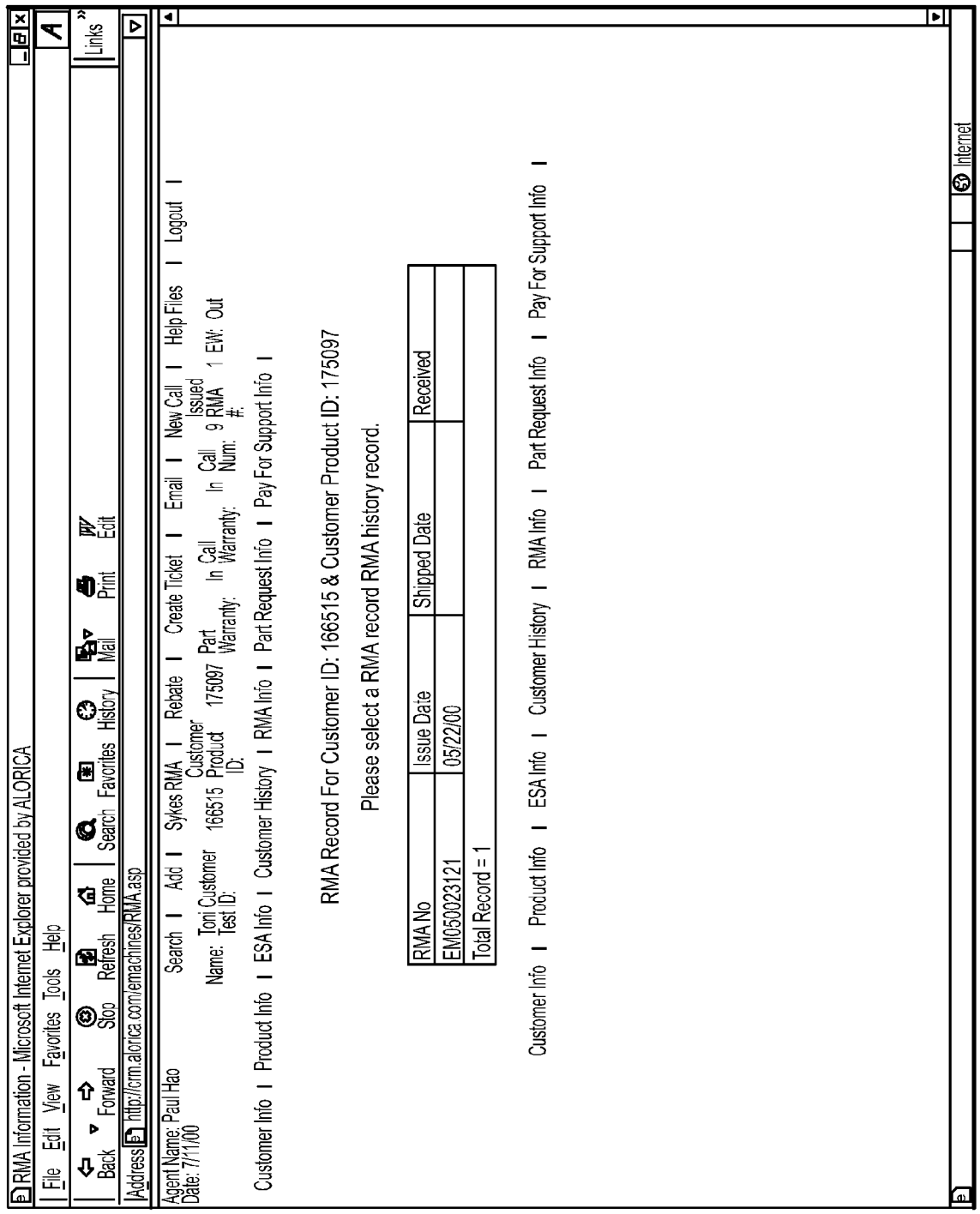

Once a customer's information along with the RMA or Warranty information are displayed (on separate pages as seen in FIGS. 14 and 15), additions or modifications can be made to the return info 120 or warranty info 126 fields of the customer record 62a, b, . . . n. A CSR will access the Return Merchandise Management module 230 in order to issue a RMA number to facilitate a return of a defective product. Similarly, a CSR will access the Warranty Administration Module 250 in order to administer warranty information as well as administer extended warranty and service plan specifics, such as the effective date for honoring reasons, warranty type or service plan, term and price. A repair facility will typically only access the return merchandise management module 230 to update the status of each returned product as it travels through all the operational stages of the repair lifecycle in the repair center. However, the repair personnel can also query each product's RMA info and/or warranty info for informational purposes. At block 608, the user can chose to add or update the return info 120 or warranty info 126 fields. The database interface 70 (at block 610) accesses the input template 74 and builds an HTML web page. At block 612, the built HTML input page is then sent to the call center 40 or repair facility 30 computers, where the CSR can issue an RMA by selecting the "Issue RMA" code or repair personnel can update the status of a returned product by selecting the product and adding additional information such as receiving info, repair stage info, quality control discrepancy results, inspection results, etc. as seen in FIG. 16. The HTTP server 52 then receives the HTML input page with the information added by the CSR or repair personnel. In response, the HTTP server 52 requests the database interface 70 to update the return info 120 or warranty info 126 fields as well as the customer modification history 118 field. The updated customer record 62*a*, *b*, . . . or *n* will be then redisplayed in one or more linked display pages at block 602.

Another unique aspect of the return merchandise management module 230 is the ability to implement a cost effective bar code solution for the repair facility. By using commercial bar code font to code the RMA number, the repair facility 30 can simply print a bar code label from the return merchandise management module 230 and place it on the returned product. Thus, rather than having to search for the returned product each time the repair personnel needs to update the status of the returned product, the repair personnel can simply scan the bar code. Since a repair personnel is identified by a unique user id, many of the update processes can be stored in the resolution codes 146 of the user record 64*a*, *b*, . . . or *n*, and automatically used to update the return info field 120 for the returned product. For example, the receiving clerk at the repair facility by scanning in the bar code will automatically register the received status, received date, and receiving clerk info in the return info 120 and customer modification history 118 fields of the customer record 62*a*, *b*, . . . or *n*.

Another feature of the warranty administration module 250 is its ability to be interlinked with the Credit Card Processing Module 260. If a customer wishes to purchase an extended warranty plan or encounter a pay for support situation, the Credit Card Processing module 260 can access the database record 62*a*, *b*, . . . or *n*, to retrieve the credit card information stored in Credit Card Info field 122. The Credit Card module 260 can charge or charge-back the credit card for the amount authorized by the customer. In addition, the credit card module 260 incorporates a universal translation bridge to be able to process the credit card through any of the major credit card servicers on the network 50. Moreover, as in the warranty module 250, the credit card processing module 260 can provide a convenient payment process with any of the other modules in the management tool 5.

Figure 7:
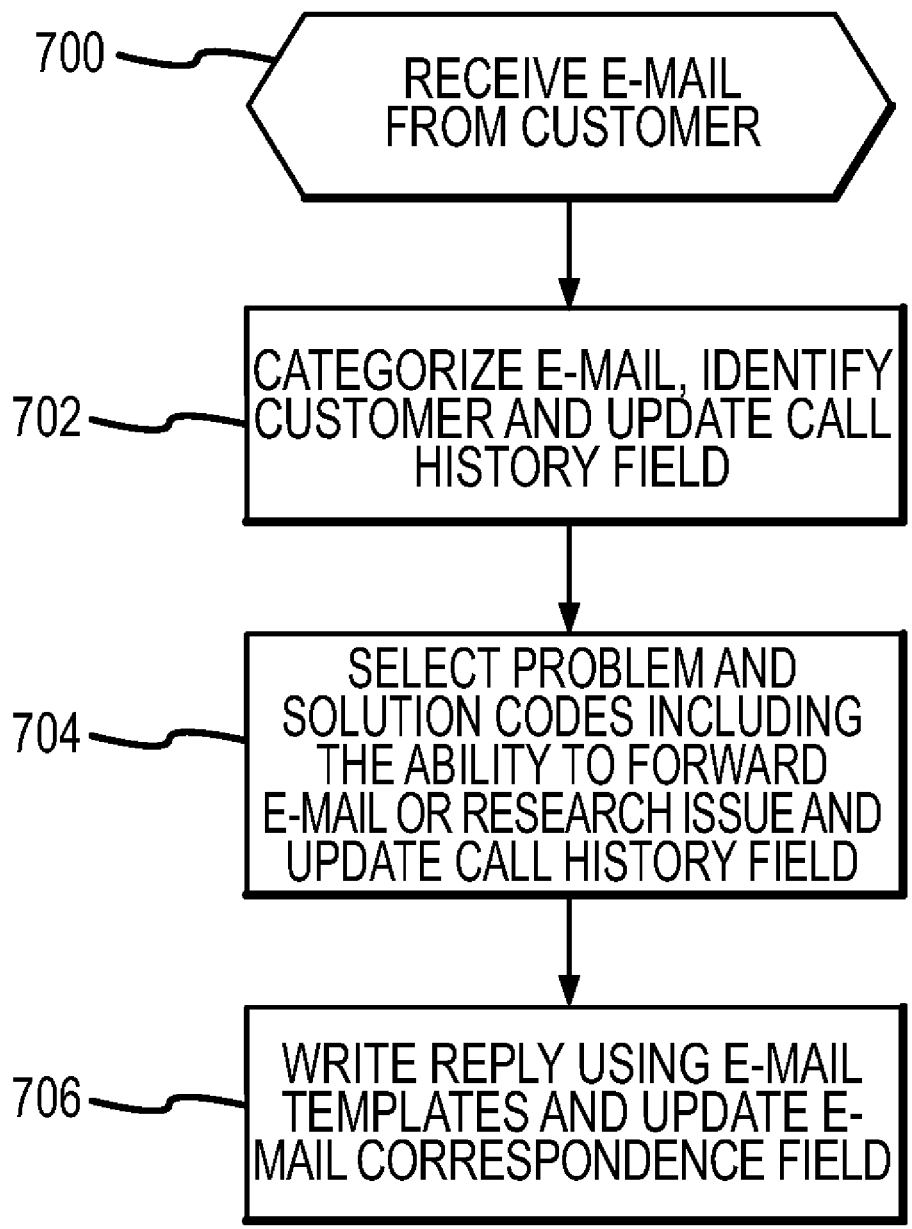
FIG. 7 illustrates a program flow implemented in the server to administer the E-mail module to categorize and respond to e-mails from customers in accordance with preferred embodiments of the present invention.
Figure 17A:
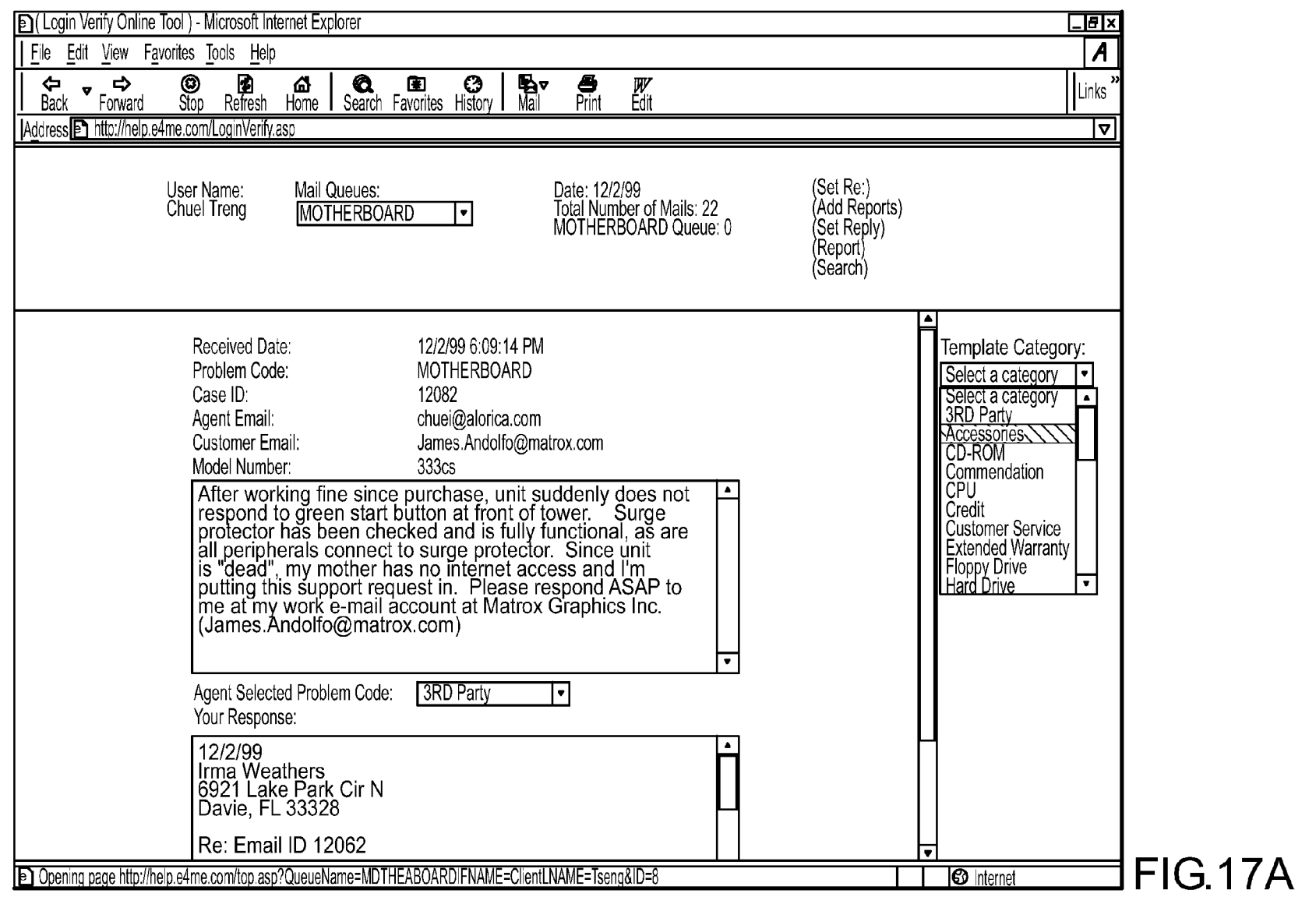
Figure 17B:
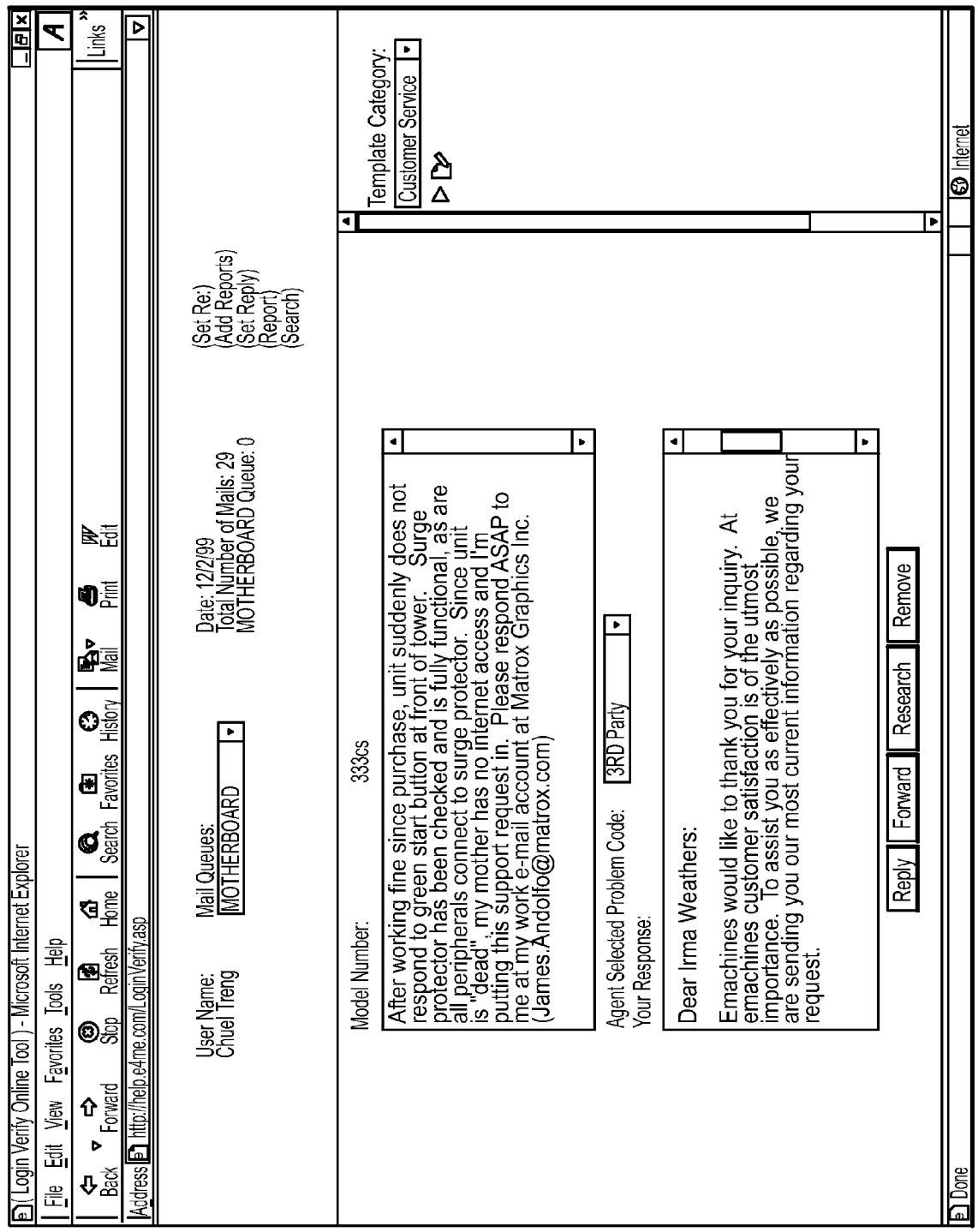

FIG. 7 illustrates the program logic implemented in the HTTP server 52, database interface 70, and the e-mail management module 240 to categorize and respond to e-mails from a customer 15. At block 700, e-mail is received from the customer 15. The e-mail management module 240 interfaces with an e-mail client program such as Microsoft Outlook and conducts a review of the e-mail's API code. The e-mail management module 240 looks for key words in the e-mail's API code to initially categorize the e-mails and send them to the appropriate CSR in charge of responding to that particular type of inquiry. For example, a warranty question will go to a warranty service representative. The identity of the customer will be ascertained by the CSR and the call history field 116 will be updated as in the logic of FIG. 5. At block 704, the CSR can make a confirmation of the nature of the e-mail and select from the list of problem codes and solution codes likely to be encountered by the CSR from the list stored in Problem Codes 144 and Resolution Codes 146 field associated with the user, including the ability to forward the e-mail or research the issues raised by the e-mail. The call history field 116 will then be updated to record the selections of the CSR. The CSR, at block 706, then fills out an e-mail response from the e-mail templates stored in the e-mail templates field 148 associated with the user record 64*a*, *b*, . . . or *n*. Since the reply window, in the preferred embodiments as seen in FIG. 17, is already populated with a standard opening and closing message, by picking the appropriate e-mail template, the CSR can reply quickly to the e-mail by either sending out an e-mail message back to the customer, forward the e-mail to the manufacturer/client 20 for second-level support, send it to a research queue for further investigation by a senior representative, or remove it. The response will then be recorded by updating the e-mail correspondance field 124. In alternative embodiments, the e-mail management module 240 can also allow the email representative to create a new template and assign it a particular category for issues that have not occurred, but might be reoccuring at a later time.

Figure 8:
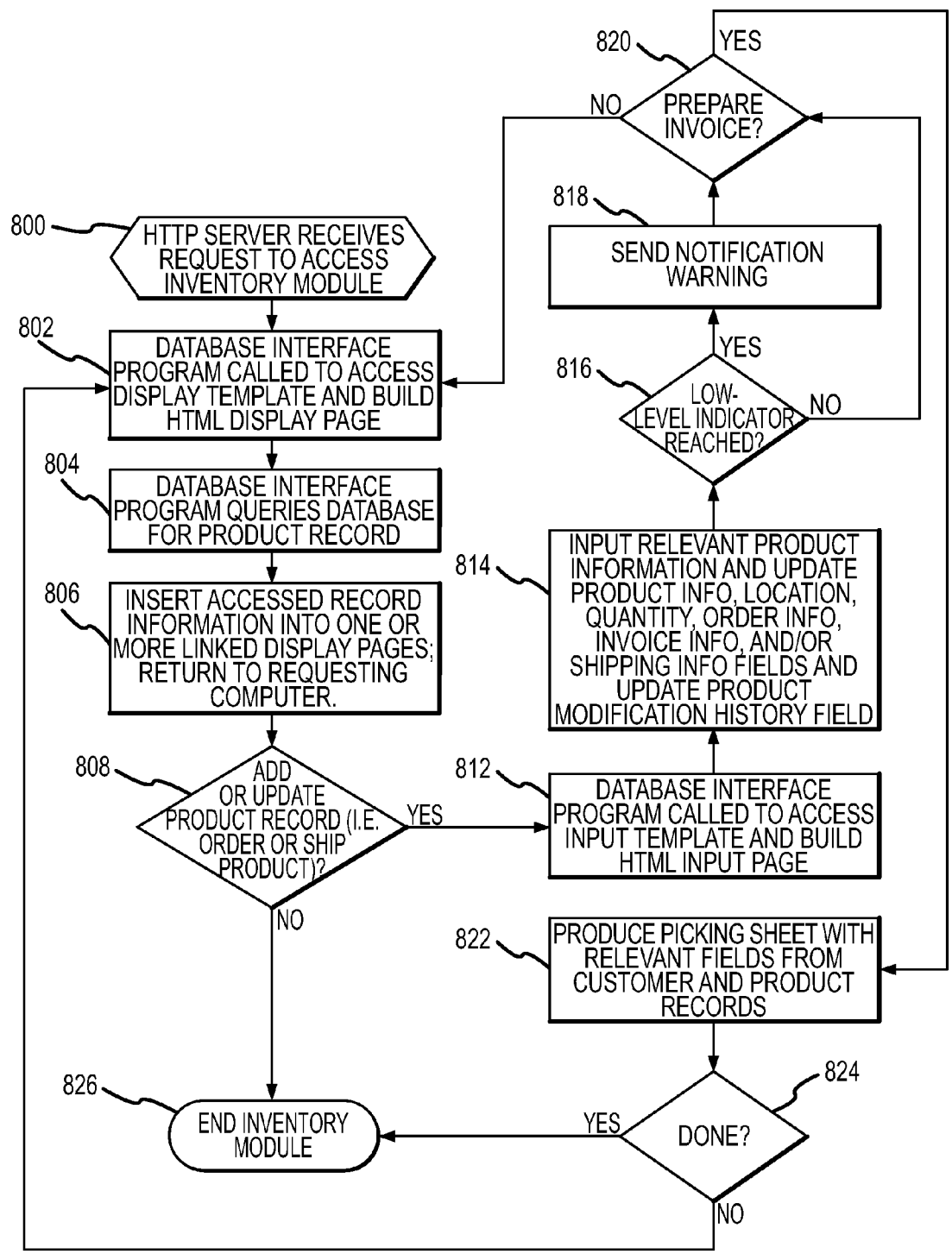
FIG. 8 illustrates a program flow implemented in the server to administer the Inventory Management module in accordance with preferred embodiments of the present invention.
Figure 18A:
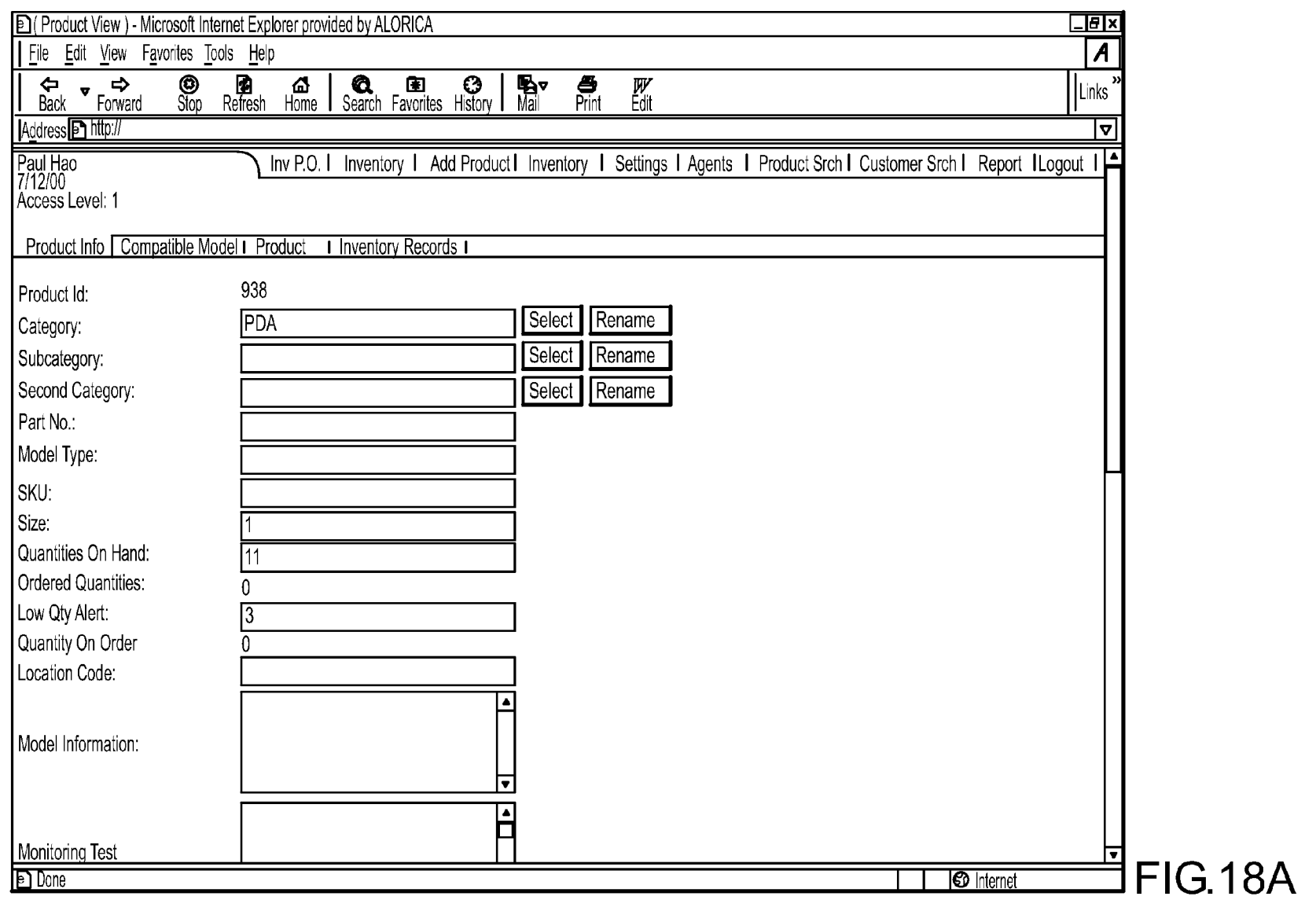
Figure 18B:
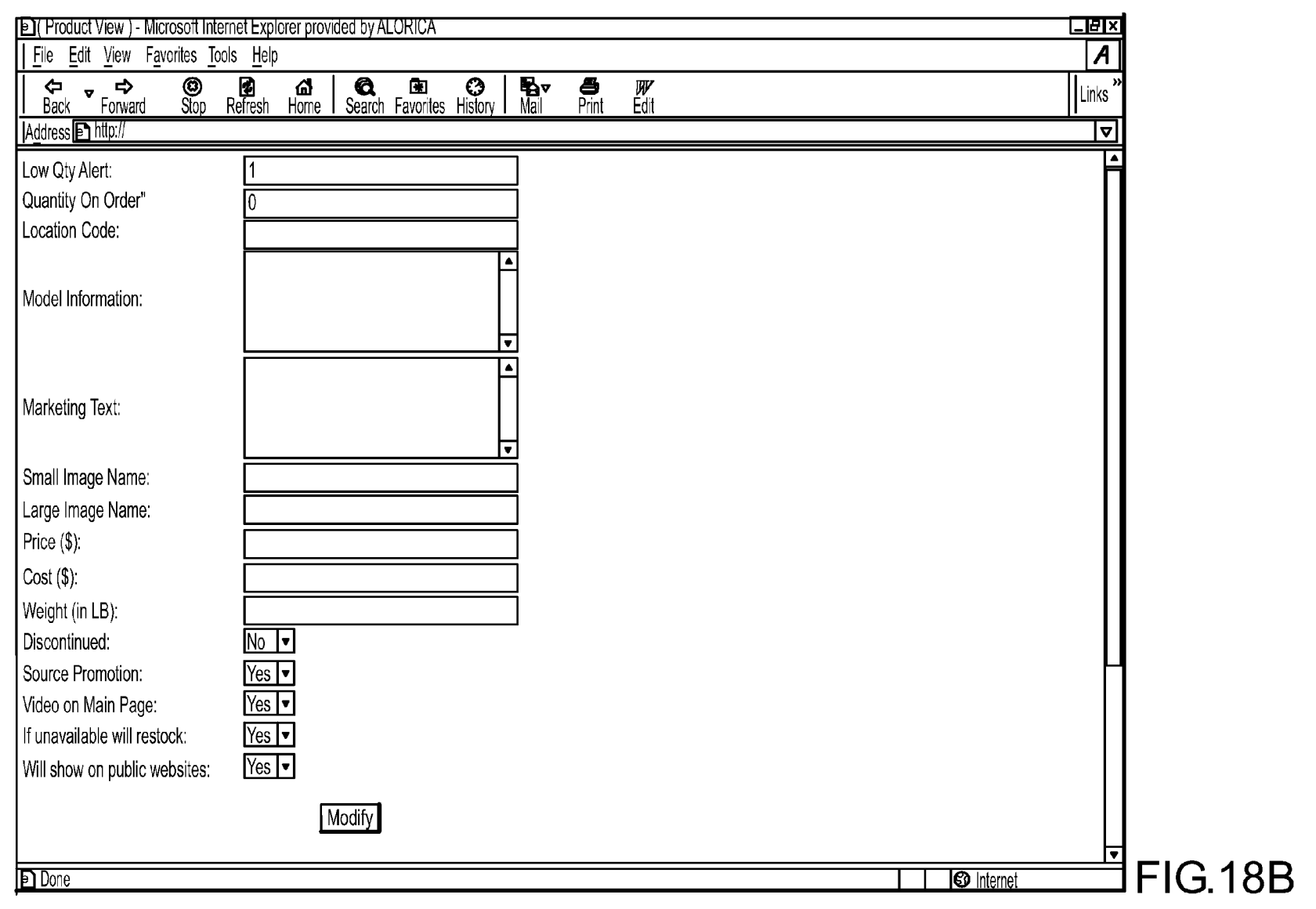

FIG. 8 illustrates the program logic implemented in the HTTP server 52 and the database interface 70 to administer the Inventory Management module 270 according to the preferred embodiments. The inventory management module 270 is designed to administer the inventory in a warehouse from purchasing, carrying, picking, packing, and shipping of products. The module 270 provides real-time inventory levels, and enables product managers to manage product specs, quantities, promotions, and categorization. A product manager, who has already logged into the inventory module 270 via a secured identification and password, can manage the inventory via the secured network 50. The module 270 typically begins at block 800, where the HTTP server 52 receives a request from the manufacturer/client 20 or warehouse 45 computers for information on a product record 66*a*, *b*, . . . or *n*. The database interface 70 can search for a product record 66*a*, *b*, . . . or *n* using the product name, category, its specs, web-store representation, quantity on hand or by querying the database for a compatible model or substitute. The database interface 70 will search the Product Information 152, Location 154, and Quantity 156 fields of the product records 66*a*, *b*, . . . *n*. At block 802, the database interface 70 accesses the display template 72 and builds an HTML web page. The database interface program 70 queries (at block 804) the database table 65 for the requested product record 66*a*, *b*, . . . or *n* and then inserts (at block 806) the returned information into the display template. The database interface 70 will then build one or more linked HTML web pages based on a display template 72. As seen in FIG. 18, this search will bring up the product information GUI ("Graphical User Interface") that is designed to display all detailed specs pertaining to this product including quantities on hand in the warehouse, inventory records, categorization, product specs, compatible model, substitute product, product modification history, etc. Thus, the generated display pages can include information from such fields as Product Info 152, Location 154, Quantity 156, Order Info 158, Invoice Info 160, Low-level Indicator 162, and Product Modification History 164 fields. Depending on the information desired, the inventory module 270 can display the information in many forms on different pages. For example, FIG. 19A shows an example of a page listing only the inventory on hand listing the product SKU number, model name, location, and quantity.

Once the relevant product record 66*a*, *b*, . . . or *n* is displayed, then at block 808 the inventory manager can make modifications to the product information if the product information needs to be changed, or to input information about a new product. To update or create a new product record 66*a*, *b* . . . or *n*, the database interface 70 (at block 812) accesses the input template 74 and builds an HTML web page. The user can then just change or input new product information, such as quantities on hand, product description, location, order info, etc. The product manager can also determine product specs, marketing information, and pictures that can be shown on a web-store displaying the product. The product manager can also categorize the product by web-store, category, sub-category, and set promotion standards. Thereafter, the product manager can select for compatible models and substitutes via the "Compatible Model" and "Substitute" Tabs by selecting compatible/substitution models and clicking the "Add" button. The product manager can also check for open inventory purchase orders via the "Inventory Records" Tab as well as set a low-level economic reorder point notification at a preferred level. In addition, the warehouse 45 can also click on the "Inventory" Tab to check and adjust real-time inventory levels by product SKU, where the page specifies each SKU's warehouse location and quantity on hand. Any time a product is shipped out, the inventory levels are decreased by one. In response, the HTTP server 52 (at block 814) requests the database interface 70 to update one or more of following fields: the product id info 152, location 154, quantity 156, order info 158, invoice info 160, low-level indicator 162, and as well as record the change in the product modification history field 164 of the specific product record 66*a*, *b*, . . . or *n*. The updated product record 66*a*, *b*, . . . *n* will be eventually redisplayed in one or more linked display pages at block 802 after a several other logic inquiries (to be discussed below).

Figure 19B:
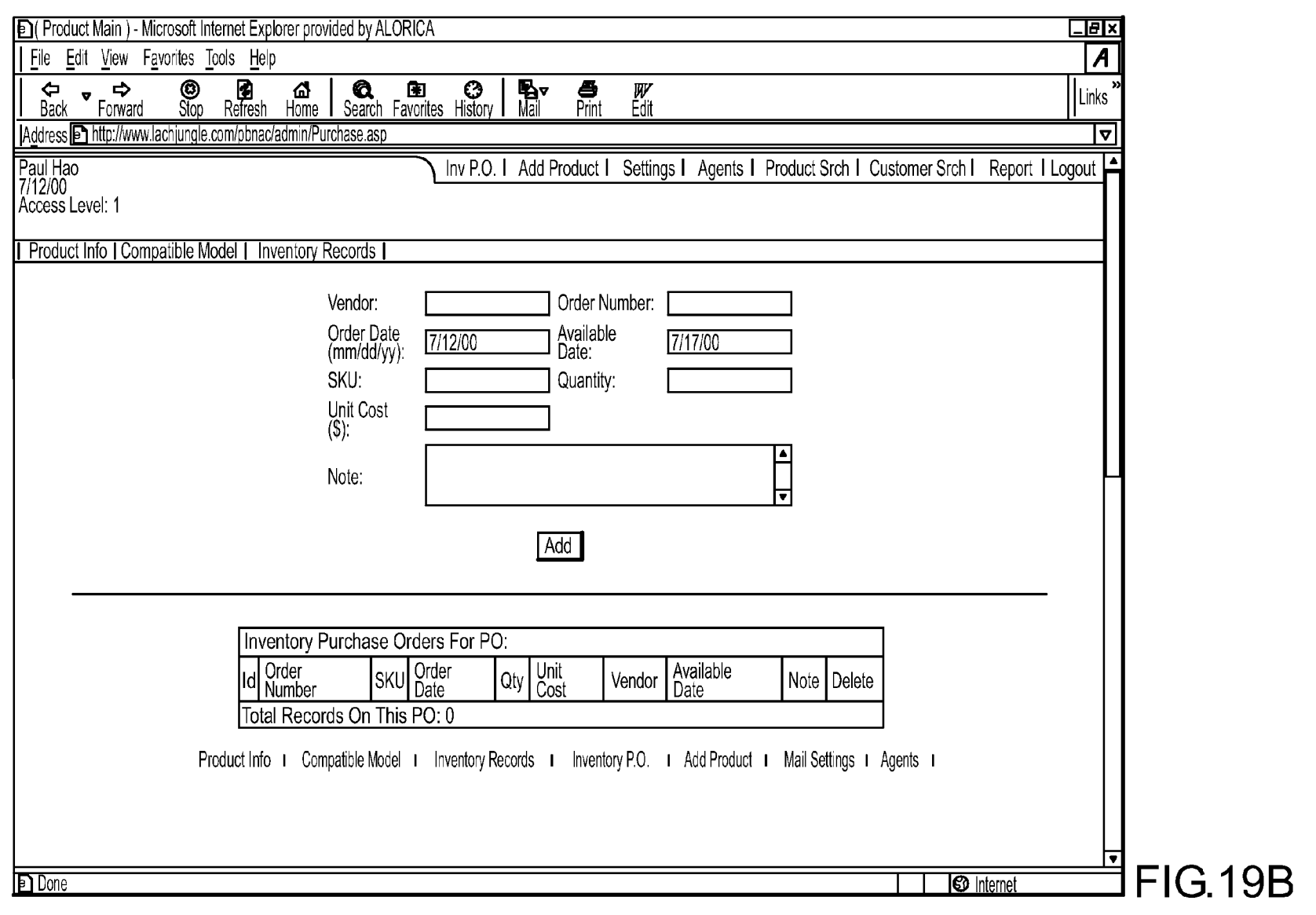
Figure 20A:
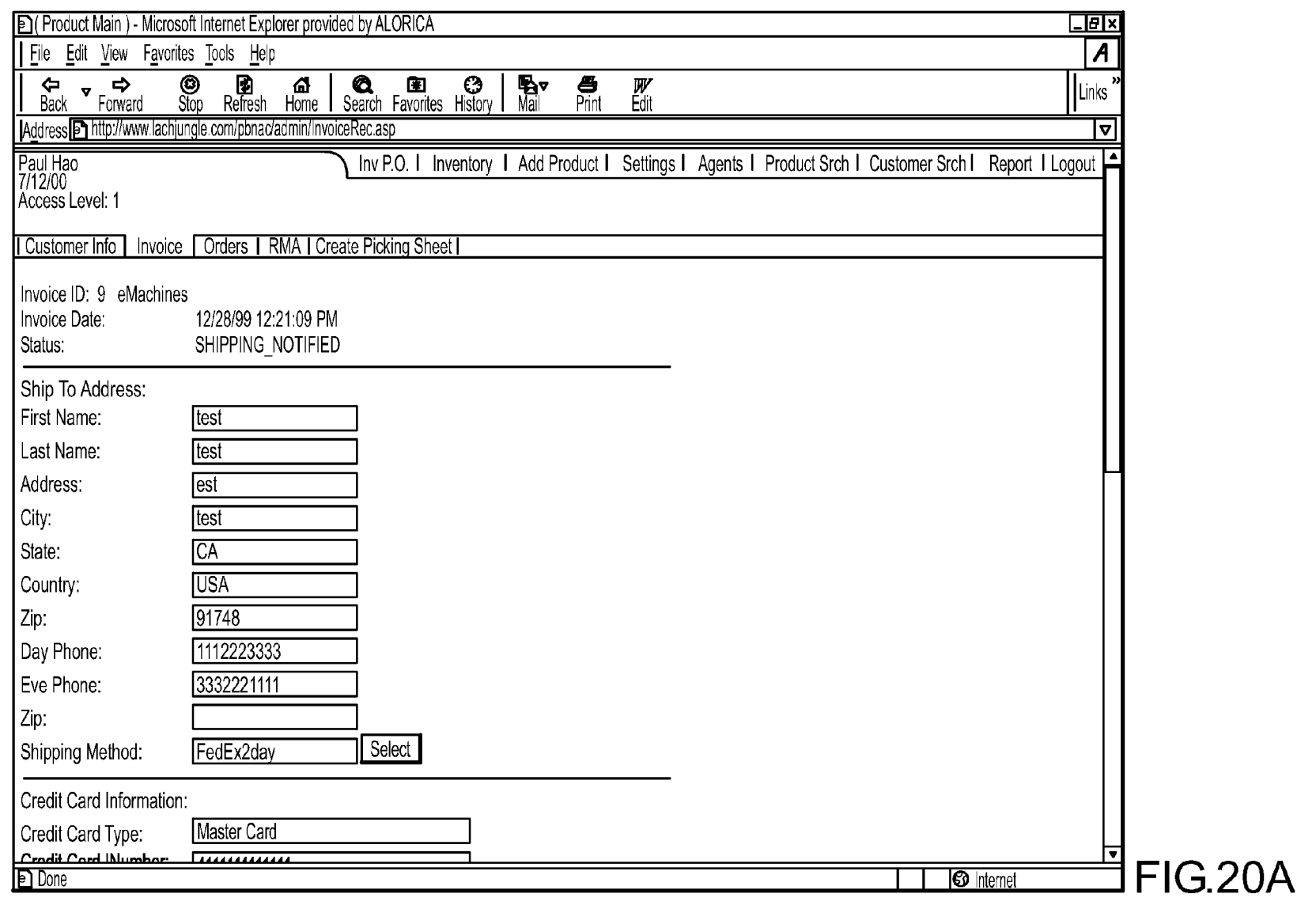

At block 816, any time there is any adjustment in the quantity field 156, a comparison is made with regards to the quantity field 156 and the low-level indicator field 162. If the quantity of products on hand reaches the number set for the low-level indicator, a notification (at block 818) is sent to the product manager or warehouse personnel. The notification can initiate the reorder process, where a user would access the inventory module 270 and enter a purchase order for the product, including the vendor, unit cost, SKU, and desired quantity, as seen in FIG. 19B. The purchase order will be recorded in both the Order Info 158 and Product Modification History 164 fields as in the logic explained above with regards to modifying a product record 66*a*, *b*, . . . or *n*. At block 820, an invoice option is available to register the sale of the product if there was an adjustment to the quantity field 156. Via the "Invoice" page, as shown in FIG. 20A, the warehouse personnel can enter or look up the customer's invoice information, e.g. shipping address, credit card information, shipping method, credit card authorization numbers, and pre-authorization dates. The information is populated from the customer's original input from the customer interaction module 220 and interlinked with the Credit Card Processing module 260 to charge the purchase ticket. The Invoice page also displays the status of the order. Once an invoice is generated, the shipping personnel can generate a Picking Sheet, as seen in FIG. 20B, to determine what products should be shipped along with a copy of the picking sheet for the customer. Moreover, in preferred embodiments, the Inventory Module 270 is integrated with third party shipping software, such as Airborne Express, UPS, etc. to monitor the progress of the product shipment from the Inventory Module 270 directly. Once the user is completed with the Inventory Module 270, the user can exit the module at block 826.

A key aspect of the inventory management module 270 is that it can be linked to a front-end GUI to act as a shopping cart for e-commerce purposes. Each purchase by a customer computer 15 can automatically interact with the inventory module 270, initiating the shipping and invoicing processes. To account for each sale, the inventory module 270 updates the location 154, quantity 156, and invoice info 160 fields of the database record 66*a*, *b*, . . . or *n*. In addition, to provide for better integration of the inventory module 270 with an e-commerce shopping cart, much of the graphics for the front-end GUI can be stored with the relevant database record 66*a*, *b*, . . . or *n*, along with its descriptions, promotions, etc. In addition, the inventory module 270 can be interlinked with the Credit Card Processing Module 260. Thereby, the inventory 270 and credit card processing 260 modules can work together to seamlessly provide an e-commerce solution over the network 50.

Figure 9:
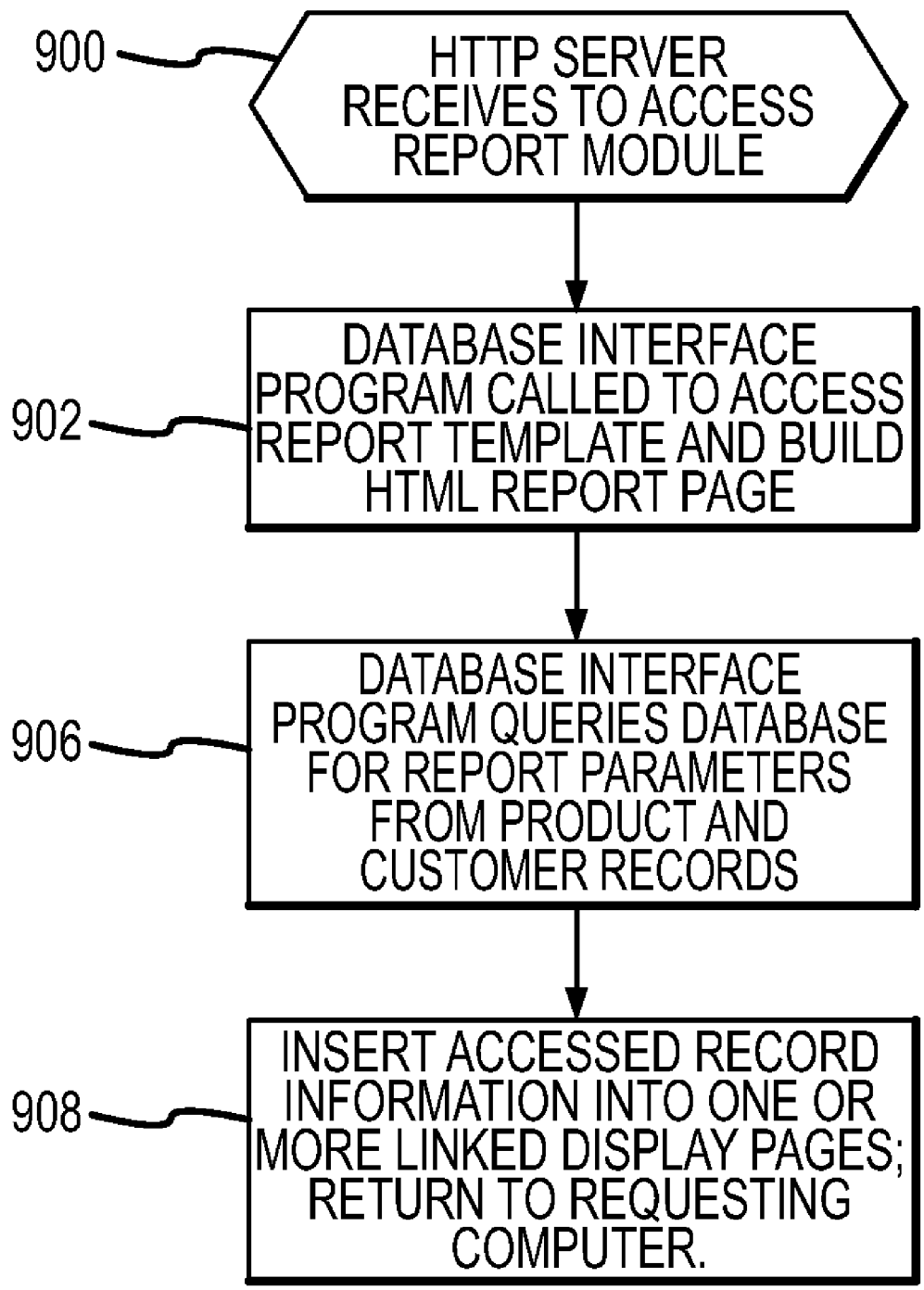
FIG. 9 illustrates a program flow implemented in the server to administer the Reporting System module in accordance with preferred embodiments of the present invention.
Figure 21A:
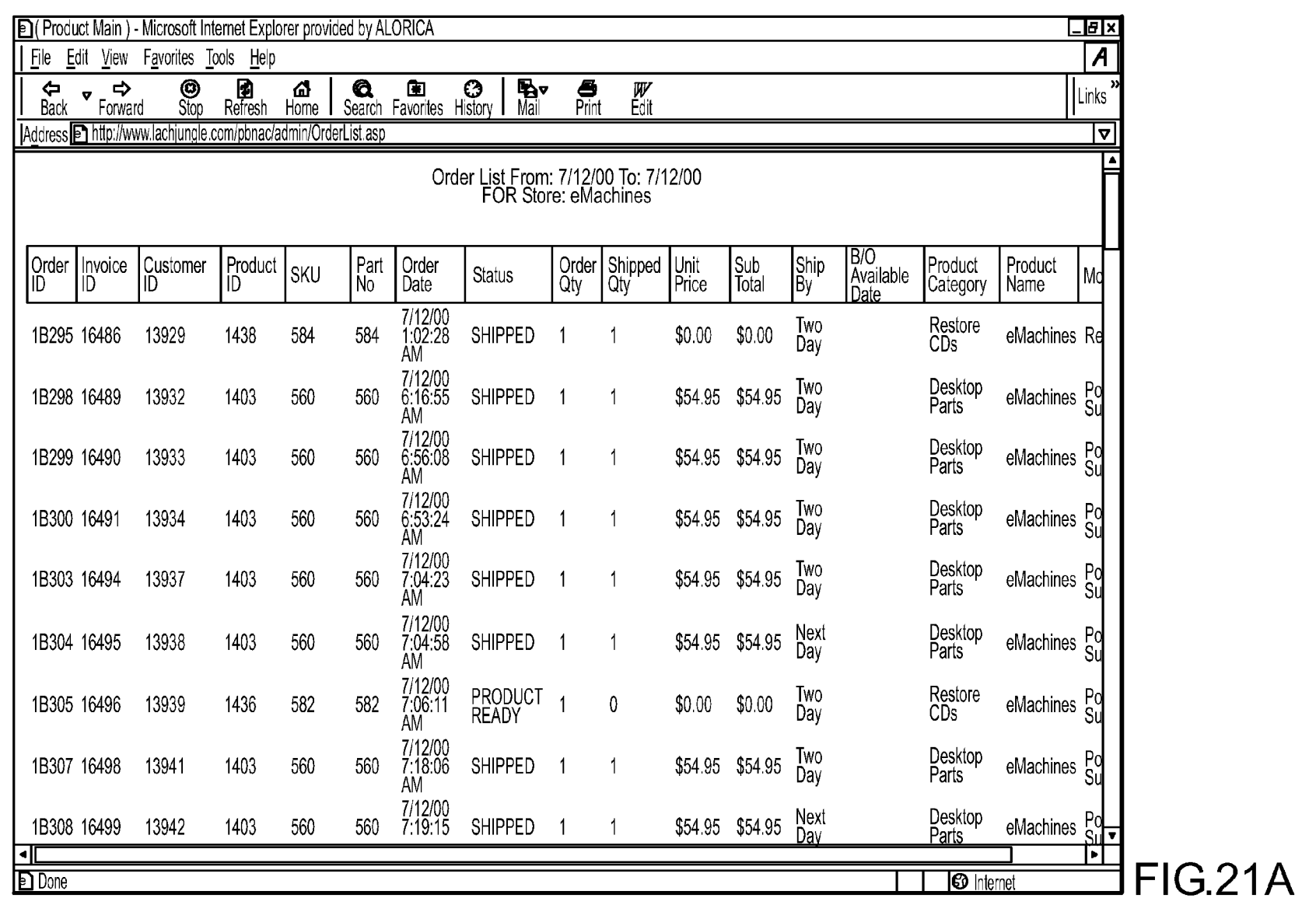
Figure 22A:
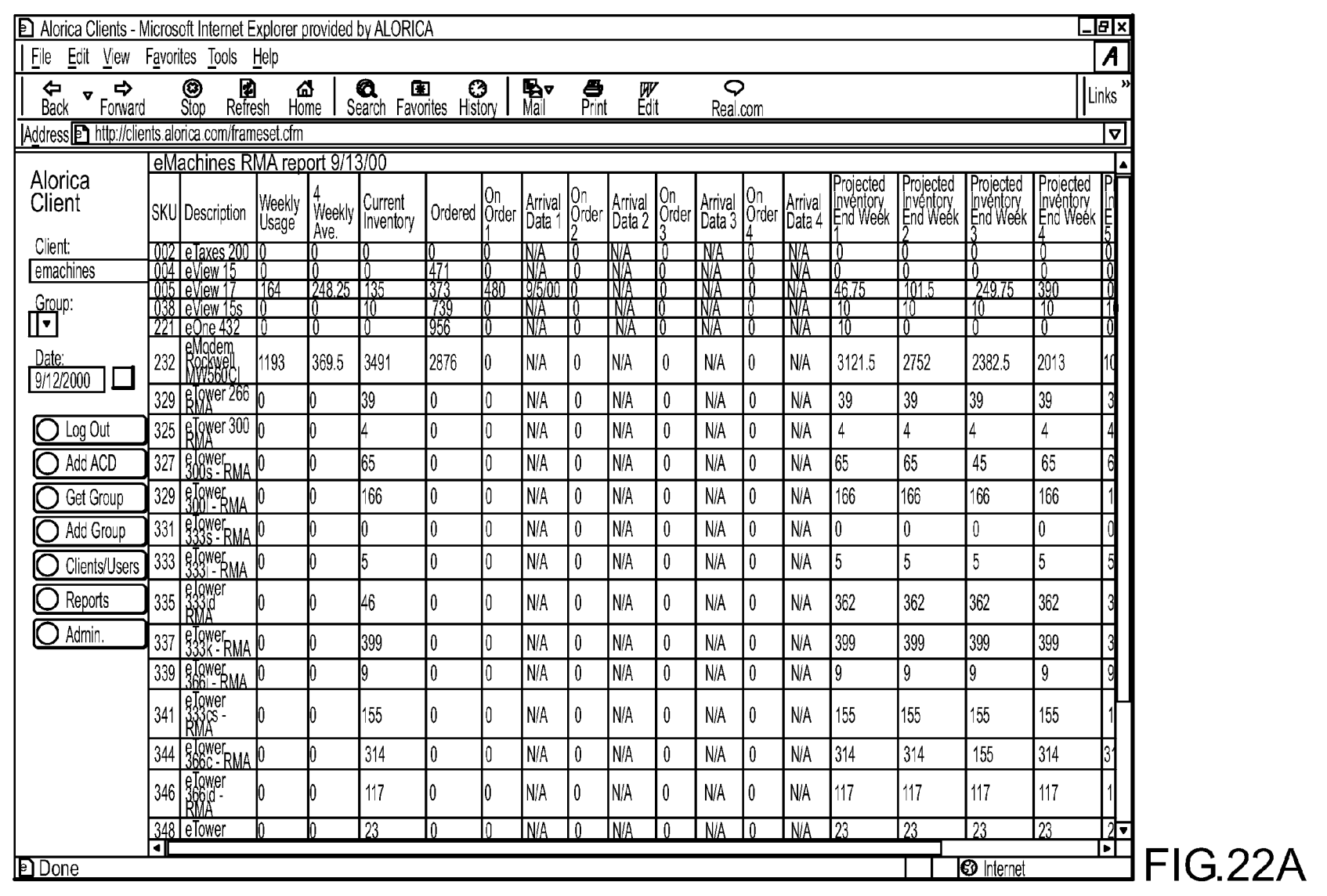

FIG. 9 illustrates the program logic implemented in the HTTP server 52 and database interface 70 to administer the Reporting System module 280 according to the preferred embodiments. The report module 280 can be accessed by the manufacturer/client 20 to report in real-time to bring the most mission critical operating and sales figures to executive managers. The reporting module 280 is thus able to aid as a decision support system to assist management in making executive decisions that might make the business more efficient and effective (e.g. changing the vendor on a product that receives a high percentage of RMAs, or changing seasonal strategies based on sales figures or customer interaction drivers). Although the type of report generated can be varied as the report templates 76, examples of reports can be seen in FIGS. 21 and 22. Typically the process of generating a report starts at block 900 where the HTTP server 52 receives a request from the manufacturer/client computer 20 to access the Reporting System module 280 from a user who has already logged into the reporting module 280 using a secured identification and password via the secured network 50. In response, the HTTP server 52 requests (at block 902) the database interface 70 to access the report template 76 and build one or more HTML report pages. The database interface program 70 queries (at block 906) the database tables 61 and/or 65 for the predefined report parameters and then inserts (at block 908) the returned information into the report template. The database interface 70 will then build one or more linked HTML web pages (at block 908) based on a report template 76 furnishing report information to the user such as Sales Report by Date Range, RMA report by product, Inventory Report by SKU, Parts Request by Date, Average e-mail request ratio by month, Geographical Sales Report, etc. Thus, the generated report pages can include information from such fields as Customer ID Info 112, Purchase Info 114, Return Info 120, E-mail Correspondence 124, Warranty Info 126, Shipping Info 128, Product Info 152, Location 154, Quantity 156, Order Info 158, and Invoice Info 160.

Those skilled in the art will appreciate that alternative embodiments exists from the description of the preferred embodiments without departing from the spirit and scope of the invention. The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments of the configuration discovery tool are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The described implementations utilized a web-based environment utilizing the Hypertext Transfer Protocol (HTTP) for transmitting documents between computers within a network. However, those skilled in the art will appreciate that the preferred embodiments may apply to any communication protocol for allowing a terminal to request and access files in a network environment.

In addition, preferred embodiments described the customer, user, and product information being implemented as database records in a database table. However, the customer, user, or product information may be implemented in any format for maintaining object information, including spreadsheet, non-database table, etc. Thus, as used herein, the terms database record, database table, and database refer to any data structure known in the art for maintaining information on data objects, such as relational databases, non-relational databases, spreadsheets, ASCII text files, etc.

In the described implementations, the pages were described as utilizing the Hypertext Markup Language (HTML) file format. However, alternative file formats for building web-like pages may be used, such as Dynamic Hypertext Mark-Up Language (DHTML), the Extensible Markup Language (XML), Cascading Style Sheets, any other Standard Generalized Markup Language (SGML), or any other language known in the art for creating interchangeable, structured documents. Further, any version of HTML may be used, including version 2.0, 3.2, 4.0, etc. In yet further implementations, the requested file may be in any other file format, i.e., other than an SGML type format, capable of being displayed or otherwise executed by the requesting terminal.

Therefore, the foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing customer and product information, comprising:
   using a computer for accessing a customer database including customer records, wherein each customer record tracks a customer;
   using said computer for accessing a product database including product records, wherein each product record tracks a product;
   using said computer for accessing inventory information;
   accessing a multi-functional customer relationship management tool within said computer which enables specific access to and manipulation of the customer and product databases by at least multiple different representatives, each representative having unique login information, and at least one of said representatives having different capabilities for said access to and manipulation of the customer and product databases than another of said representatives, and where access to said customer database includes at least one operation that effects said inventory information, and where access to said product database includes access to said inventory information;
   using the computer for detecting a first unique login of a first representative, and for accessing a user database, and for determining access based on information in said user database;
   using the computer for granting access to a first subset of said customer and product databases based on said information in said user database, said granting access allowing said first representative to review and modify previous customer contacts, access product information, and access servicing information associated with said first subset, and allowing said first representative to take actions that effect said inventory information, but not allowing said first representative to access said inventory management information;
   using the computer for enabling the first representative to update the customer database, from information received from the customer to add or modify a specific customer record logging the customer contact and recording a new product or warranty purchase information, service request, return merchandise request, or complaint;
   using the computer for detecting a second unique login of a second representative; and
   using the computer for allowing said second representative and determining access of said based on information in said user database, said access being to a second subset of information including management of said inventory information, to update inventory information in a product record regarding a product at a warehouse location.

2. The method of claim 1, wherein said multi-functional customer relationship management tool includes a plurality of modules, and the plurality of modules includes at least four members of a set of modules comprising a customer interaction module, a return merchandise management module, a warranty administration module, an e-mail module, an inventory management module, a reporting system module and a credit card processing module.

3. The method of claim 1, further comprising:
   transmitting to the at least one client representative over the Internet an HTML web page as an input page in which the first client representative enters data to update the customer database.

4. The method of claim 1, further comprising:
   transmitting to the at least one client representative over the Internet an input page in which the at least one client representative enters search information to request customer record information from the customer database;
   receiving the input page transmitted by the at least one client representative including a request for customer record information;
   generating an information page including customer record information for the customer record specified in the received input page; and
   transmitting the information page to the at least one client representative over the Internet.

5. The method of claim 1 further comprising:
   providing problem and solution codes that are selectable by the at least one client representative; and recording any additions or modifications in either the customer or product records using the problem and solution codes.

6. The method of claim 5, wherein a contact from the customer is by an e-mail and an email module is used to respond back to the customer, wherein the e-mail module scans the e-mail for key words and categorizes the email for appropriate response using predetermined problem and solution codes, and e-mail templates are used to form a response to the customer.

7. The method of claim 1, further comprising: interlinking with a front-end GUI to display an image of a product and information about the product over the Internet; processing a payment for a purchase of the product or an extended warranty from information stored in one of the customer records in the customer database; updating the customer and product records to account for the purchase of the product; updating said inventory information based on said purchase and updating the customer record to account for the purchase of the extended warranty.

8. The method of claim 1, further comprising:
enabling access to a return merchandise management module by a repair facility representative; and
producing a printable sheet with a bar code identifying a returned product using a commercial bar code font to code the bar code.

9. The method of claim 7, further comprising: producing a printable sheet with information on the purchase of the product.

10. The method of claim 1, further comprising: producing a report based on information from the customer and product records.

11. The method of claim 1, further comprising: interlinking a third party shipping software with the product database; and updating the product database from information received from the third party shipping software to add or modify a specific product record indicating shipping information about the product.

12. A computer readable medium containing a set of instructions for a general purpose computer having a user interface, and causing at least one computer to perform:
accessing a customer database including customer records, wherein each customer record tracks a customer;
accessing a product database including product records, wherein each product record tracks a product;
accessing inventory information;
accessing a multi-functional customer relationship management tool, wherein each module enables specific access to and manipulation of the customer and product databases by multiple different representatives, each representative having unique login information, and at least one of said representatives having different capabilities than another of said representatives;
detecting a first unique login of a first representative;
granting access to a first subset of said customer and product databases based on said detecting said first unique login, said granting access allowing said first representative to review previous customer contacts, product information, and servicing information and also to take actions that effect said inventory information, but not allowing said client representative to access any information other than said first subset including not allowing said first representative to manage said inventory information;
enabling the first representative to update the customer database from information received from the customer to add or modify a specific customer record logging the customer contact and recording any new product or warranty purchase information, service request, return merchandise request, or complaint using at least one of the plurality of modules and to purchase items, where the purchase effects said inventory information;
detecting a second unique login of a second representative; and
allowing said second representative, access to a second subset of information including management of said inventory information, to update inventory information in a product record regarding a product at a warehouse location.

13. The program of claim 12, wherein said multi-functional customer relationship management tool includes a plurality of modules, and the plurality of modules includes at least four members of a set of modules comprising a customer interaction module, a return merchandise management module, a warranty administration module, an e-mail module, an inventory management module, a reporting system module and a credit card processing module.

14. The program of claim 12, further capable of causing at least one computer to perform: transmitting to the at least one client representative over the Internet an input page in which the at least one client representative enters data to update the customer database.

15. The program of claim 12, further capable of causing at least one computer to perform:
transmitting to the at least one client representative over the Internet an input page in which the at least one client representative enters search information to request customer record information from the customer database; receiving the input page transmitted by the at least one client representative including a request for customer record information; generating an information page including customer record information for the customer record specified in the received input page; and
transmitting the information page to the at least one client representative over the Internet.

16. The program of claim 12, further capable of causing at least one computer to perform:
providing problem and solution codes that are selectable by the at least one client representative; and
recording any additions or modifications in either the customer or product records using the problem and solution codes.

17. The program of claim 12, wherein a contact from the customer is by an e-mail and an email module is used to respond back to the customer, wherein the e-mail module scans the e-mail for key words and categorizes the email for appropriate response using predetermined problem and solution codes and e-mail templates are used to form a response to the customer.

18. The program of claim 12, further capable of causing at least one computer to perform: interlinking with a front-end GUI to display an image of a product and information about the product over the Internet; processing a payment for a purchase of the product or an extended warranty from the information stored in one of the customer records in the customer database; updating the customer and product records to account for the purchase of the product; and updating the customer record to account for the purchase of the extended warranty.

19. The program of claim 12, further capable of causing at least one computer to perform: enabling access to a return merchandise management module by a repair facility representative; and producing a printable sheet with a bar code identifying a returned product using a commercial bar code font to code the bar code.

20. The program of claim 18, further capable of causing at least one computer to perform: producing a printable sheet with information on the purchase of the product.

21. The program of claim 12, further capable of causing at least one computer to perform: producing a report based on information from the customer and product records.

22. The program of claim 12, further capable of causing at least one computer to perform:
   interlinking a third party shipping software with the product database; and
   updating the product database from information received from the third party shipping software to add or modify a specific product record indicating shipping information about the product.

23. A system for managing customer and product information comprising:
   a customer database including customer records;
   a product database including product records;
   an inventory database including inventory information;
   a user database including user records; and
   a multi-functional customer relationship management computer including a plurality of modules controlled by the computer, said plurality of modules including at least a customer interaction module running on said computer that allows interaction with a customer, a return merchandise management module running on said computer that allows returning products, a warranty administration module running on said computer that allows determining warranty information for a product, an inventory management computer module that allows determining and updating inventory, each of said modules running on said computer;
   the multi-functional customer relationship management computer configured to detect a first unique login of a first representative and to enable a first representative, to interact with a first subset of said customer and product databases based on said detecting said first unique login, said granting access allowing said first representative to access a return merchandise management module that allows returning products, a warranty administration module that allows determining warranty information for a product associated with said first client, and allowing said first representative to take actions that effect inventory, but not allowing said first representative access to an inventory management module that allows determining and updating inventory, said multi-functional customer relationship management computer further configured to detect a second unique login of a second representative and to enable a second client representative to interact with an inventory management module that allows determining and updating inventory, wherein said inventory management module also interfaces with another module, located at a different site from the first client representative, to update inventory information in a product record for said first client regarding a product at a warehouse location associated with said first client.

24. The system of claim 23, further comprising: a database interface configured to create an input page in which the at least one client representative is able to enter data to update the customer database; and
a server configured to transmit the input page over the Internet to the at least one client representative.

25. The system of claim 23, further comprising: a database interface configured to create an input page in which the at least one client representative is able to enter search information to request customer information from the customer database; and
   an HTTP server configured to transmit the input page over the Internet to the at least one client representative, and to receive a modified input page transmitted by the at least one client representative including a request for customer record information,
   the database interface further configured to generate an information page including customer record information for the customer record specified in a received modified input page, the HTTP server further configured to transmit the information page to the at least one client representative over the Internet.

26. The system of claim 23, wherein the multi-function customer relationship management tool is configured to provide problem and solution codes that are selectable by the at least one client representative and to record additions or modifications in one of the product records or one of the customer records using selected problem and solution codes.

27. The system of claim 23, wherein the plurality of modules further includes an email module configured to enable the at least one client representative to respond to an email received from a customer, to scan the email for key words, to categorize the email for appropriate response using predetermined problem and solution codes, and to use an email template to generate a response to the customer.

28. The system of claim 23, wherein the plurality of modules includes a credit card processing module for processing a purchase of a product or an extended warranty using information stored in a customer record.

29. The system of claim 23, wherein the plurality of modules includes a return merchandise management module configured to enable a repair facility representative to access customer records in the customer database and configured to generate a bar code using a commercial bar code font to identify a returned product.

30. The system of claim 23, wherein the plurality of modules includes a report module configured to enable the at least one client representative to create a report including information from the customer records and the product records.

31. The system of claim 23, wherein the plurality of modules includes an inventory module integrated with third party shipping software, the inventory module configured to add or modify a specific product record to include shipping information about a product.

32. A method as in claim 1, wherein said databases include status of products that have been removed from inventory to be sent to a customer.

* * * * *